US007184664B2

(12) United States Patent
Farmer et al.

(10) Patent No.: US 7,184,664 B2
(45) Date of Patent: Feb. 27, 2007

(54) METHOD AND SYSTEM FOR PROVIDING A RETURN PATH FOR SIGNALS GENERATED BY LEGACY TERMINALS IN AN OPTICAL NETWORK

(75) Inventors: James O. Farmer, Lilburn, GA (US); John J. Kenny, Suwanee, GA (US); Patrick W. Quinn, Lafayette, CA (US); Deven J. Anthony, Tampa, FL (US)

(73) Assignee: Wave7 Optics, Inc., Alpharetta, GA (US)

( * ) Notice: Subject to any disclaimer, the term of this patent is extended or adjusted under 35 U.S.C. 154(b) by 379 days.

(21) Appl. No.: 10/041,299

(22) Filed: Jan. 8, 2002

(65) Prior Publication Data

US 2003/0011849 A1 Jan. 16, 2003

Related U.S. Application Data

(63) Continuation-in-part of application No. 09/899,410, filed on Jul. 5, 2001.

(60) Provisional application No. 60/309,484, filed on Aug. 3, 2001.

(51) Int. Cl.
*H04B 10/00* (2006.01)
(52) U.S. Cl. .......................................... 398/72; 398/67
(58) Field of Classification Search ............ 398/66–73, 398/78
See application file for complete search history.

(56) References Cited

U.S. PATENT DOCUMENTS

| 4,500,990 A | 2/1985 | Akashi |
| 4,665,517 A | 5/1987 | Widmer |
| 4,763,317 A | 8/1988 | Lehman et al. |
| 4,956,863 A | 9/1990 | Goss |

(Continued)

FOREIGN PATENT DOCUMENTS

EP 0713347 A2 5/1996

(Continued)

OTHER PUBLICATIONS

Miki, Tetsuya et al., "A Design Concept on Fiber-Optic Wavelength-Division-Multiplexing Subscriber Loop System" WTG—Fachber, 1980, pp. 41-45.

(Continued)

*Primary Examiner*—Agustin Bello
(74) *Attorney, Agent, or Firm*—King & Spalding LLP

(57) ABSTRACT

A return path system includes inserting RF packets between regular upstream data packets, where the data packets are generated by communication devices such as a computer or internet telephone. The RF packets can be derived from analog RF signals that are produced by legacy video service terminals. In this way, the present invention can provide an RF return path for legacy terminals that shares a return path for regular data packets in an optical network architecture. The invention operates independently of a legacy upstream transmission timing scheme so that the legacy upstream transmission timing scheme can remain effective in preventing data collisions. In other embodiments, the present invention allows for less complex hardware for subscribers that are not taking data services. Further, an optical signal present line in combination with a driver may be employed in order to reduce the amount of hardware in a laser transceiver node.

53 Claims, 21 Drawing Sheets

U.S. PATENT DOCUMENTS

| | | | |
|---|---|---|---|
| 4,975,899 A | 12/1990 | Faulkner | |
| 5,132,992 A | 7/1992 | Yurt et al. | |
| 5,179,591 A | 1/1993 | Hardy et al. | |
| 5,247,347 A * | 9/1993 | Litteral et al. | 725/114 |
| 5,249,194 A | 9/1993 | Sakanushi | |
| 5,253,250 A | 10/1993 | Schlafer et al. | |
| 5,253,275 A | 10/1993 | Yurt et al. | |
| 5,325,223 A | 6/1994 | Bears | |
| 5,345,504 A | 9/1994 | West, Jr. | |
| 5,349,457 A | 9/1994 | Bears | |
| 5,365,588 A | 11/1994 | Bianco et al. | |
| 5,412,498 A | 5/1995 | Arstein et al. | |
| 5,469,507 A | 11/1995 | Canetti et al. | |
| 5,510,921 A | 4/1996 | Takai et al. | |
| 5,528,582 A | 6/1996 | Bodeep et al. | |
| 5,534,912 A * | 7/1996 | Kostreski | 725/106 |
| 5,541,917 A | 7/1996 | Farris et al. | |
| 5,550,863 A | 8/1996 | Yurt et al. | |
| 5,557,317 A * | 9/1996 | Nishio et al. | 725/92 |
| 5,559,858 A | 9/1996 | Beveridge | |
| 5,572,347 A | 11/1996 | Burton et al. | |
| 5,572,348 A | 11/1996 | Carlson et al. | |
| 5,572,349 A | 11/1996 | Hale et al. | |
| 5,666,487 A * | 9/1997 | Goodman et al. | 709/246 |
| 5,701,186 A | 12/1997 | Huber | |
| 5,706,303 A | 1/1998 | Lawrence | |
| RE35,774 E * | 4/1998 | Moura et al. | 725/118 |
| 5,778,017 A | 7/1998 | Sato et al. | |
| 5,790,523 A | 8/1998 | Ritchie, Jr. et al. | |
| 5,793,413 A | 8/1998 | Hylton et al. | |
| 5,802,089 A | 9/1998 | Link | |
| 5,861,966 A | 1/1999 | Ortel | |
| 5,875,430 A | 2/1999 | Koether | |
| 5,880,864 A | 3/1999 | Williams et al. | |
| 5,892,865 A | 4/1999 | Williams | |
| 5,969,836 A | 10/1999 | Foltzer | |
| 6,002,720 A | 12/1999 | Yurt et al. | |
| 6,041,056 A * | 3/2000 | Bigham et al. | 370/395.64 |
| 6,097,159 A | 8/2000 | Mogi et al. | |
| 6,097,515 A * | 8/2000 | Pomp et al. | 398/45 |
| 6,144,702 A | 11/2000 | Yurt et al. | |
| 6,151,343 A | 11/2000 | Jurgensen | |
| RE37,125 E | 4/2001 | Carlson et al. | |
| 6,295,148 B1 | 9/2001 | Atlas | |
| 6,336,201 B1 | 1/2002 | Geile et al. | |
| 6,356,369 B1 | 3/2002 | Farhan | |
| 6,360,320 B1 | 3/2002 | Ishiguro et al. | |
| 6,385,366 B1 | 5/2002 | Lin | |
| 6,427,035 B1 | 7/2002 | Mahony | |
| 6,460,182 B1 | 10/2002 | BuAbbud | |
| 6,483,635 B1 | 11/2002 | Wach | |
| 6,546,014 B1 | 4/2003 | Kramer et al. | |
| 6,674,967 B2 | 1/2004 | Skrobko et al. | |
| 6,738,983 B1 * | 5/2004 | Rao et al. | 725/120 |
| 6,804,256 B2 * | 10/2004 | Chang | 370/468 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0030785 A1 | 10/2001 | Pangrac et al. | |
| 2002/0021465 A1 | 2/2002 | Moore, Jr. et al. | |
| 2002/0039218 A1 | 4/2002 | Farmer et al. | |
| 2002/0089725 A1 | 7/2002 | Farmer et al. | |
| 2002/0135843 A1 | 9/2002 | Gruia | |
| 2002/0164026 A1 | 11/2002 | Huima | |
| 2003/0090320 A1 | 5/2003 | Skrobko et al. | |
| 2003/0128983 A1 * | 7/2003 | BuAbbud et al. | 398/71 |

FOREIGN PATENT DOCUMENTS

| | | |
|---|---|---|
| EP | 0720322 A2 | 7/1996 |
| EP | 0 566 662 | 11/1999 |
| EP | 0955739 A2 | 11/1999 |
| EP | 0 933 892 | 10/2003 |
| ES | 0720322 A2 | 3/1995 |
| JP | 4-504433 | 3/2002 |
| MX | 180038 | 11/1995 |
| TW | 72821 | 8/1995 |
| WO | WO 01/27940 A2 | 4/2001 |
| WO | WO 02/030019 A3 | 4/2002 |
| WO | WO 02/30020 A2 | 4/2002 |
| WO | WO 02/060123 A2 | 8/2002 |

OTHER PUBLICATIONS

International Search Report of Jul. 7, 2003 for PCT/US01/51350.
Angelopoulos, J.D. et al., "A Transport Mac Method for Bandwidth Sharing and CDV Control at the ATM Layer of Passive Optical Networks" Journal of Lightwave Technology, IEEE, 1996, pp. 2625-2634.
International Search Report of Jul. 2, 2003 for PCT/US03/07814.
International Search Report of Oct. 3, 2003 for PCT/US03/12231.
Ciciora, Walter S. et al., "Modern Cable Television Technology: Video, Voice, and Data Communications", © 1999, pp. 162-214, Chapter 4, Morgan Kaufmann Publishers, Inc., San Francisco, California.
Glaesemann, G. Scott et al., "The Mechanical Reliability of Corning® Optical Fiber in Bending White Paper", Sep. 2002, pp. 1-4.
Corning® SMF-28™ Optical Fiber Product Information, "Corning® Single-Mode Optical Fiber", Apr. 2002, pp. 1-4.
Companie Deutsch, Components for Fiber Optics, "Triplexers—WDM: FSAN—TPM Series", pp. 1-6.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb", Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Optical Networks Daily, A Publication of Optical Keyhole, Aug. 26, 2003, pp. 1-13.
International Preliminary Examination Report of Oct. 27, 2003 for PCT/US01/21298.
Bourne, John et al., "Heathrow—Experience and Evolution" IEEE, 1990, pp. 1091-1095.
Yamaguchi, K. et al., "A Broadband Access Network Based on Optical Signal Processing: The Photonic Highway" IEEE, 1990, pp. 1030-1037.
Written Opinion of Jul. 23, 2003 for PCT/US02/028734.
International Search Report of Jul. 7, 2003 for PCT/US01/51350.
International Search Report dated Apr. 22, 2003 for PCT/US01/50361.
L. Zhang et al., "Label-switching architecture for IP traffic over WDM networks", IEE Proc.-Commun., vol. 147, No. 5, Oct. 2000, pp. 269-275.
J. Masip-Torné, et al., "Providing Differentiated Service Categories in Optical Packet Networks", Proceedings of the International Teletraffic Congress 1999, ITC-16_Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.
J. Bannister et al., "How Many Wavelengths Do We Really Need? A Study of the Performance Limits of Packet Over Wavelengths", Optical Networks Magazin, SPIE, Bellingham, WA, vol. 1, No. 2, Apr. 2000, pp. 17-28.
O. W.W. Yang, et al., "All-Optical WDM/TDM Star-Bus Network Using Optical Amplifiers", Journal of Optical Communications, Fuchverlage Schiele & Schon, Berlin, DE, vol. 16. No. 6, Dec. 1, 1995, pp. 216-226.
Walter Cieiora et al., "Modern Cable Television Technology; Video, Voice, and Data Communications", © 1999 by Morgan Kaufman Publishers, Inc., pp. 167-176.
International Search Report dated Apr. 21, 2003 for PCT/US02/28734.
Written Opinion dated May 6, 2003 for PCT/US01/21298.

International Search Report dated Dec. 4, 2002 for PCT/US02/27398.

International Search Report dated Dec. 17, 2002 for PCT/US02/15861.

Global Access ™, Universal Services Gateway, USG100, ARRIS, pp. 1-2. Oct. 18, 2002.

Global Access ™, Universal Access Switch, UA4024, ARRIS, pp. 1-2, Aug. 28, 2002.

Partial International Search Report dated Jan. 3, 2003 for PCT/US01/31032.

"Trading Update and Operational Review Presentation" Marconi, Sep. 4, 2001, pp. 1-35.

"Cable Market" 2 pgs, Marconi Corporation, PLC, 2000 at www.Marconi.com.

"Communications" 2 pgs, Marconi Corporation, PLC, 2000 at www.Marconi.com.

"Dalton Utilities" 9 pgs, Marconi Corporation, PLC, 2002 at www.Marconi.com.

"Deep Fiber Solutions" 3 pgs, Marconi Corporation, PLC, 2000 at www.Marconi.com.

"Deep Fiber HFC Features and Benefits" 1 pg, Marconi Corporation, PLC, 2002 at www.Marconi.com.

"Deep Fiber HFC Network Diagram" 1 pg, Marconi Corporation, PLC, 2002 at www.Marconi.com.

"Deep Fiber HFC Product Overview: New FITL Configuration" 2 pgs, Marconi Corporation, PLC, 2002 at www.Marconi.com.

"Deep Fiber HFC Technical Specifications" 2 pgs, Marconi Corporation, PLC, 2002 at www.Marconi.com.

"Deep Fiber HFC—New FITL Configuration" 1 pg, Marconi Corporation, PLC, 2002 at www.Marconi.com.

"En-Touch" at 5 pgs, Marconi Corporation, PLC, 2002 www.Marconi.com.

"Fiber to the Home" International Engineering Consortium (no date) pp. 1-10, available at www.iec.com.

"Deep Fiber HFC" Marconi Corporation PLC 2000, pp. 1-2.

"Integrated Voice, Video and Data Services Over a Single Fiber: A Compelling Opportunity for Cable Operators" Marconi Corporation PLC, May 2000, 6 pgs.

"Deep Fiber Solutions: Advanced Broadband Services" Marconi Corporation PLC, May 2000, 5pgs.

"Deep Fiber HFC: A Next-Generation Integrated Access Solution Offering Significant Improvement Over Traditional HFC Architectures" Marconi Corporation PLC, May 2000, 8pgs.

"A Gold Mine of Opportunities in the Face of Increasing Competition: Choices for Utilities Entering the Communications Marketplace" Marconi Corporation PLC, May 2000, 6pgs.

"Fiber Optics on New Development MDUs: A Research Summary," Marconi Corporation PLC, May 2000, 5pgs.

"Thermal Management Challenges: Small ONU Enclosures," Marconi Corporation PLC, May 2000, 9pgs.

"Passive Optical Networks—Is There Light at the End of the Access Tunnel?" CIBC World Markets Inc., Jan. 11, 2001, pp. 1-66.

"36.2.4 8B/10B transmission code", IEEE 2000, pp. 966-969.

G. Khoe et al., "Coherent Multicarrier Technology for Implementation in the Customer Access," IEEE, May/Jun. 1993, pp. 695-713.

L. Linnell, "A Wide-Band Local Access System Using Emerging-Technology Components," IEEE, Jul. 1986, pp. 612-618.

"Digital Broadband Delivery System: Out of Band Transport—Mode B," Society of Cable Telecommunications Engineers, Inc., Aug. 10, 1998, 76 pgs.

"Digital Broadband Delivery System: Out of Band Transport—Mode A," Society of Cable Telecommunications Engineers, Inc., Aug. 26, 1998, 49 pgs.

B. Gaglianello & P. Thompson, "An Efficient MAC Layer Protocol for EPON," IEEE 802.3 EFM Nov. 2001, 9 pgs.

"Policing and Shaping Overview" *Quality of Service Solutions Configuration Guide*, Cisco Systems, Inc. (No Date).

"Cisco IOS™ Software Quality of Service Solutions," Cisco Systems, Inc. 1998, 28 pgs.

International Search Report for PCT/US01/21298, 2 pgs , mailed Jun. 17, 2002.

International Search Report for PCT/US02/03056, 1 pg, mailed Jun. 12, 2002.

"Ethernet—Accelerating the Standard for Speed," 7 pgs, Gigabit Ethernet Alliance, Nov. 2000 at www.gigabit-ethernet.org.

"eLuminant—Asynchronous Transfer Mode (ATM) Passive Optical Networks (PONS) Tutorial" 28 pgs, the International Engineering Consortium, 2000 at www.iec.org.

Plehier et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechiel Corporation, pp. 1-9.

McDevitt et al., Switched vs Broadcast Video for Fiber-to-the Home Systems, Alcatel Network Systems, 1990, IEEE, CH2829-0/90/0000-1109, pp. 1109-1119.

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC- Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

* cited by examiner

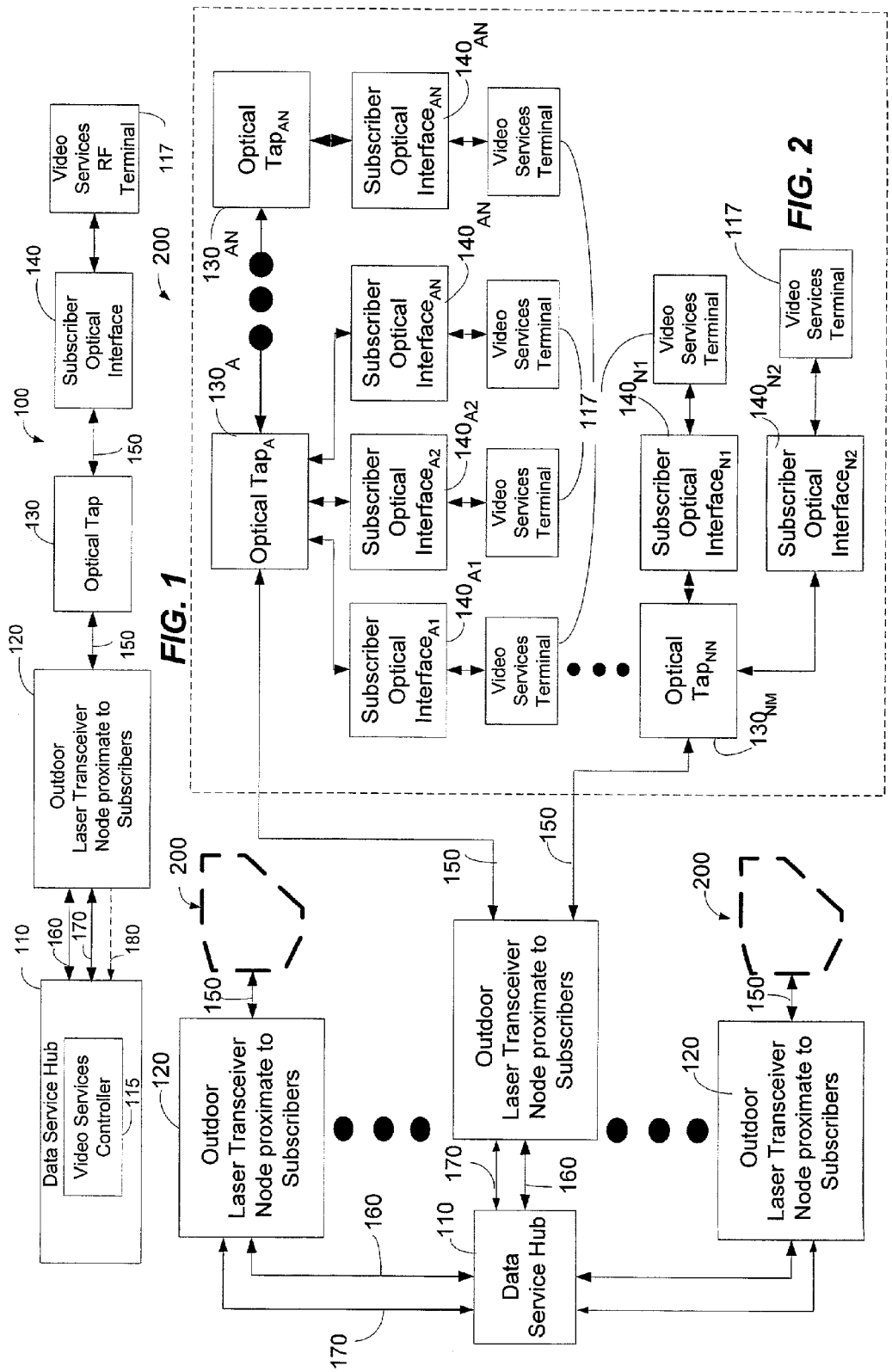

Laser Transceiver 120B Node

Laser Transceiver Node 120C

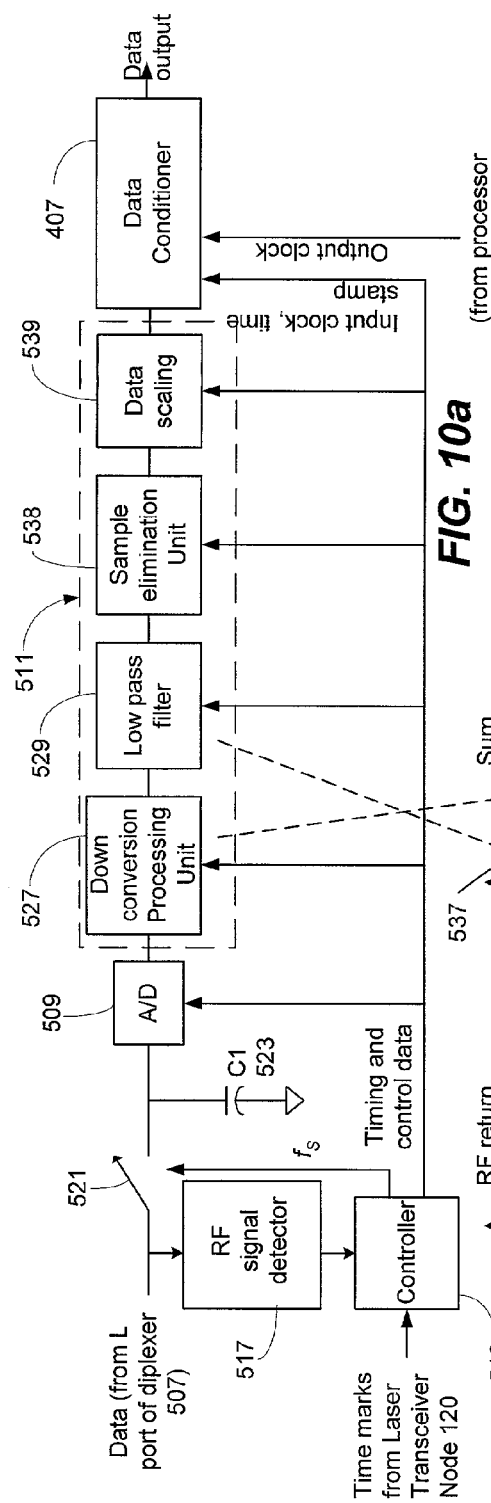

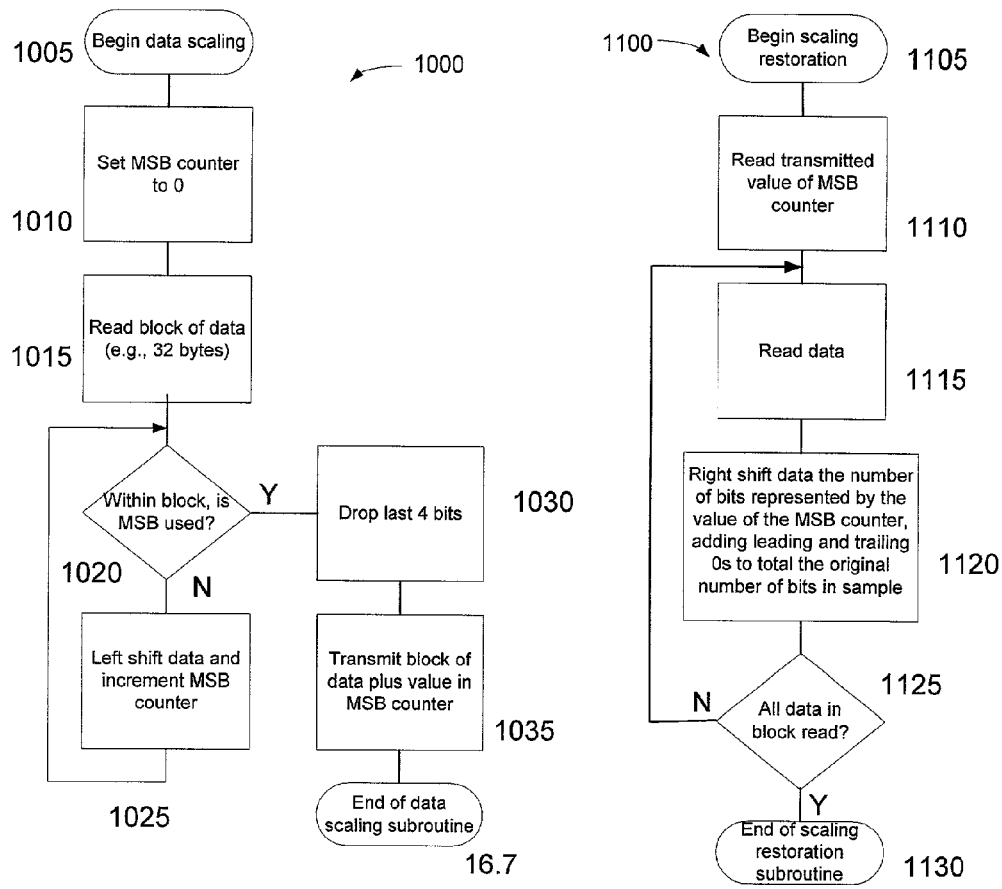
*FIG. 10d*  *FIG. 11b*
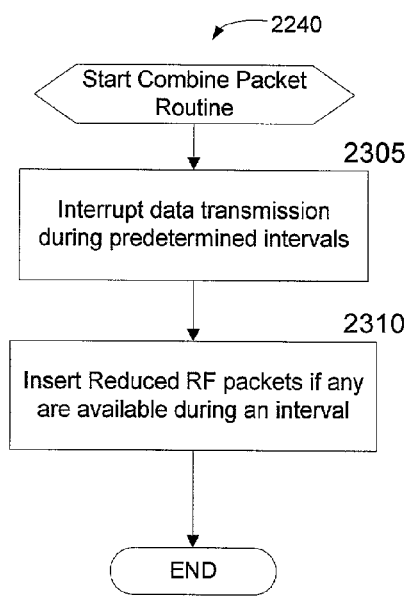
*FIG. 23*

METHOD AND SYSTEM FOR PROVIDING A RETURN PATH FOR SIGNALS GENERATED BY LEGACY TERMINALS IN AN OPTICAL NETWORK

STATEMENT REGARDING RELATED APPLICATIONS

The present application is a continuation-in-part of non-provisional patent application entitled, "System and Method for Communicating Optical Signals Between A Data Service Provider and Subscribers," filed on Jul. 5, 2001 and assigned U.S. application Ser. No. 09/899,410; and the present application claims priority to provisional patent application entitled, "Method and Apparatus for Returning RF Signals from Subscribers to the Headend," filed on Aug. 3, 2001 and assigned U.S. application Ser. No. 60/309,484.

TECHNICAL FIELD

The present invention relates to video, voice, and data communications. More particularly, the present invention relates to a fiber-to-the-home (FTTH) system that is capable of propagating RF terminal signals from a subscriber to a data service provider.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While the FTTH optical network architecture has been a dream of many data service providers because of the aforementioned capacity of optical fibers, implementing the FTTH optical network architecture may encounter some problems associated with legacy systems that are in current use by subscribers. For example, many subscribers of data service providers use set top terminals (STTs) to receive and transmit information related to video services. The conventional set top terminals are coupled to a coaxial cable. The coaxial cable, in turn, is then connected to fiber optic cables in a hybrid fiber-coax (HFC) system. The coaxial cable from the set top terminals in combination with the fiber optic cables provide a two way communication path between the set top terminal and the data service hub for purposes such as authorizing a subscriber to view certain programs and channels.

For example, conventional set top terminals coupled to coaxial cables may provide impulse pay-per-view services. Impulse pay-per-view services typically require two way communications between the set top terminal and the data service provider. Another exemplary service that may require two-way communication passed between the set top terminal and the data service provider is video-on-demand (VOD) services.

For video on demand services, a subscriber can request a program of his choosing to be played at a selected time from a central video file server at the data service hub. The subscriber's VOD program request is transmitted upstream on a return channel that comprises coaxial cables coupled to fiber optic cables. With the VOD service, a subscriber typically expects VCR-like control for these programs which includes the ability to "stop" and "play" the selected program as well as "rewind" and "fast forward" the program.

In conventional HFC systems, a return RF path from the subscriber to the data service hub is provided. The RF return path is needed because a conventional set top terminal usually modulates its video service upstream data onto an analog RF carrier. While the video service upstream data may be modulated onto an RF carrier, it is recognized that the upstream data may be in digital form.

An RF return path typically comprises two-way RF distribution amplifiers with coaxial cables and two-way fiber optic nodes being used to interface with fiber optic cables. A pair of fiber optic strands can be used to carry the radio frequency signals between the head end and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). In a more recent embodiment, the upstream spectrum (typically 5–42 MHz in North America) is digitized at the node. The digital signals are transmitted to the headend, where they are converted back to the analog RF spectrum of 5–42 MHz. This process typically uses high data rates (at least 1.25 Gb/s) and a fiber or wavelength dedicated to return traffic from one or two nodes.

Unlike HFC systems, conventional FTTH systems typically do not comprise a return RF path from the subscriber to the data service hub because most of the return paths comprise only fiber optic cables that propagate digital data signals as opposed to analog RF signals. In conventional FTTH systems, a downstream RF path is usually provided because it is needed for the delivery of television programs that use conventional broadcast signals. This downstream RF path can support RF modulated analog and digital signals as well as RF modulated control signals for any set top terminals that may be used by the subscriber. However, as noted above, conventional FTTH systems do not provide for any capability of supporting a return RF path for RF analog signals generated by the legacy set top terminal.

Accordingly, there is a need in the art for the system and method for communicating optical signals between a data service provider and a subscriber that eliminates the use of the coaxial cables and the related hardware and software necessary to support the data signals propagating along the coaxial cables. There is also a need in the art for a system and method that provides a return path for RF signals that are generated by legacy video service terminals. An additional need exists in the art for a method and system for propagating upstream RF packets with very low latency and jitter. A further need exists in the art for a method in system for communicating optical signals between a data service provider and a subscriber that preserves the upstream transmission timing scheme that is controlled by a legacy video service controller. Another need exists in the art for supporting legacy video service controllers and terminals with an all optical network architecture.

SUMMARY OF THE INVENTION

The present invention is generally drawn to a system and method for efficient propagation of data and broadcast signals over an optical fiber network. More specifically, the present invention is generally drawn to an optical network architecture that can provide a return path for RF signals that are generated by existing legacy video service terminals. Video service terminals can comprise set top terminals or other like communication devices that may employ RF carriers to transmit upstream information.

In one exemplary embodiment, a portion of the return path may be housed in a subscriber optical interface. The subscriber optical interface may comprise an analog to digital converter where analog RF electrical signals produced by a video service terminal are converted to digital electrical signals.

The return path in the subscriber optical interface may further comprise a data reducer that shortens or reduces the size of the digitized RF electrical signals. A data conditioner can be coupled to the data reducer for generating identification information as well as timing information that are linked to the digitized and reduced RF signals to form RF packets. That is, an RF packet can comprise digitized and reduced RF signals that are coupled with identification and timing information. The timing information, also referred to as a time stamp, processed by the data conditioner is one important feature of the invention that is used later in a data service hub to reconstruct the analog RF electrical signals as will be discussed below.

The data conditioner may further comprise a buffer such as a FIFO for speeding up the transmission rate of the RF packets. This increase in transmission rate of the RF packets is another important feature of the present invention. A switch connected to the data conditioner and processor can be controlled by the processor of the subscriber optical interface. The switch may be activated at appropriate times to combine the RF packets with data signals destined for a data service hub.

More specifically, the RF packets may be inserted between upstream packets comprising data generated by a subscriber with a communication device such as a computer or internet telephone. The term "upstream" can define a communication direction where a subscriber originates a data signal that is sent upwards towards a data service hub of an optical network. Conversely, the term "downstream" can define a communication direction where a data service hub originates a data signal that is sent downwards towards subscribers of an optical network.

This insertion of RF packets between data packets for upstream transmission is yet another important feature of the invention. In other words, the timing at which the RF packets are inserted between upstream data packets for upstream transmission is one inventive aspect of the present invention. The amount of time between RF packet transmissions is typically smaller than the amount of time allotted for the production of the analog RF signal produced by the video service terminal.

Stated differently, the size of the RF signal produced by the video service terminal as measured in time is usually greater than the amount of time between upstream transmission of the RF packets. While the upstream transmission of data packets can be interrupted at intervals with upstream RF packet transmission, it is noted that the intervals of interruption do not need to be regularly spaced from one another in time. However, in one embodiment, the interruptions can be designed to be spaced at regular, uniform intervals from one another. In another exemplary embodiment, the interruptions could be spaced at irregular, non-uniform intervals from one another. With the present invention, the upstream transmission of RF packets can occur with very low latency and jitter.

Another unique feature of the present invention is that the timing between legacy video service terminal transmissions is typically not controlled by the present invention. In other words, the present invention can preserve the upstream transmission timing scheme that is generated by the legacy video service controller that is housed within the data service hub. The upstream transmission timing scheme generated by the legacy video service controller is usually designed to eliminate any collisions between RF signals produced by different video service terminals. The present invention can operate independently of this legacy upstream transmission timing scheme so that the legacy upstream transmission timing scheme can remain effective.

Another portion of the RF return path may be disposed in a transceiver node coupled to the subscriber optical interface. The transceiver node may comprise an optical tap routing device that can separate the RF packets from the data packets. Another data conditioner comprising a buffer such as a FIFO may be coupled to the optical tap routing device in order to slow down the transmission rate of the RE packets. The decrease in the transmission rate of the RF packets is another inventive feature of the present invention. The RF packets leaving the data conditioner may be converted to the optical domain with an optical transmitter. Since the RF packets leaving the conditioner have a slower transmission rate, low power and inexpensive optical transmitters can be used. The optical transmitter may propagate the RF packets towards the data service hub along an optical waveguide that can also carry downstream video signals and video service control signals.

A data service hub may comprise another portion of the RF return path. This portion of the RF return path may comprise a diplexer that separates downstream video and video service control signals from upstream RF packets. The RF packet can then be converted back to the electrical domain with an optical receiver. The upstream RF packets may be processed by a delay generator that plays back the upstream RF packets with a predetermined delay that corresponds with the time stamp of the RF packet. The RF packet may then be expanded with a data to RF converter that transforms the RF packet back to its original analog RF signal format. An RF receiver coupled to a video service controller may then process the restored analog RF signals.

In another alternate exemplary embodiment, some subscribers may not be taking data services while other subscribers are taking data services. In this embodiment, a simple analog optical transmitter can be provided in the subscriber optical interface for the subscribers not taking data services while the hardware for forming the RF data packets from the subscribers not receiving data can be housed in the transceiver node.

In a further exemplary embodiment, all subscribers may not be receiving or transmitting any data. In this exemplary embodiment, a simple analog optical transmitter can be provided in each subscriber optical interface while the hardware for forming the RF data packets is housed in the transceiver node. Also, all hardware associated with handling data in the transceiver node can be eliminated.

In an additional exemplary embodiment where all of the subscribers may not be receiving or transmitting any data, a simple analog optical transmitter can be provided in the subscriber optical interface while the laser transceiver node is designed to propagate analog optical signals back to the data service hub.

In another alternative exemplary embodiment, an optical signal present line in combination with a driver may be employed in order to reduce the amount of hardware in a node. Specifically, the optical signal present line may permit two or more optical receivers to be serviced by a signal multiplexer. In such an embodiment, the optical signal present line can also function to detect a new terminal as it is added to the optical network.

BRIEF DESCRIPTION OF THE DRAWINGS

FIG. 1 is a functional block diagram of some core components of an exemplary optical network architecture according to the present convention that can support legacy video services.

FIG. 2 is a functional block diagram illustrating additional aspects of an exemplary optical network architecture according to the present invention.

FIG. 10*a* is a functional block diagram illustrating some core components of a data reducer.

FIG. 10*b* is a graph illustrating an exemplary Nyquist sampling spectrum of an RF return signal according to one exemplary embodiment of the present invention.

FIG. 10*c* is a graph illustrating an exemplary digitized RF signal that is multiplied by a number representing a sinusoidal waveform.

FIG. 10*d* is a logic flow diagram illustrating an exemplary method for scaling data received from a video service terminal that can be performed by a data scaling unit illustrated in FIG. 10*a*.

FIG. 11*a* is a functional block diagram that describes further details of a data-to-RF converter.

FIG. 11*b* illustrates an exemplary scaling restoration process according to one exemplary embodiment of the present invention.

FIG. 23 is a logic flow diagram illustrating an exemplary subprocess of combining reduced RF packets with regular data packets of a routine in FIG. 22.

DETAILED DESCRIPTION OF EXEMPLARY EMBODIMENTS

Figure 3:
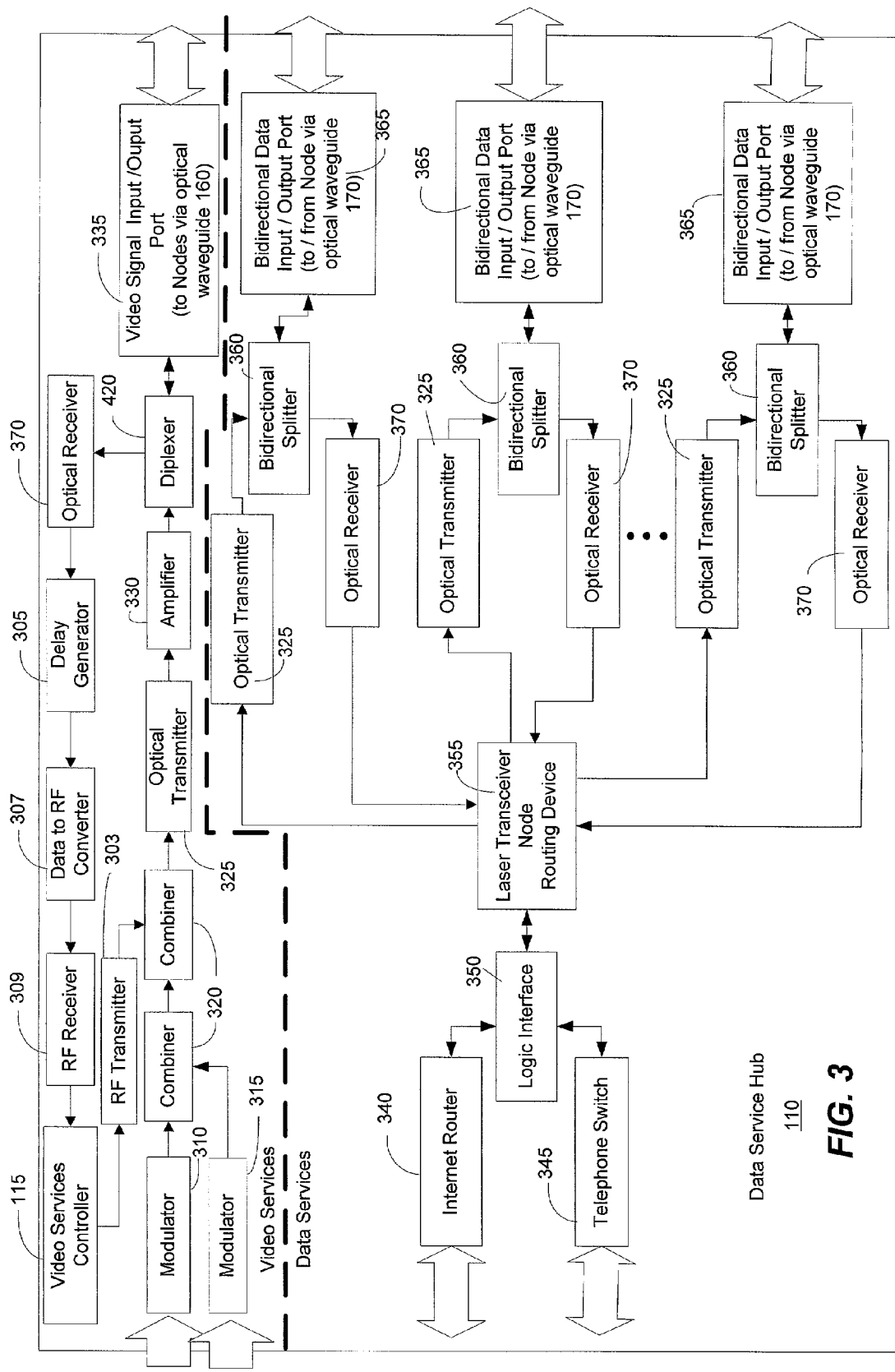
FIG. 3 is a functional block diagram illustrating an exemplary data service hub of the present invention.

The present invention may be embodied in hardware or software or a combination thereof disposed within an optical network. In one exemplary embodiment, the present invention provides a method for inserting RF packets between upstream packets comprising data generated by a subscriber with a communication device such as a computer or internet telephone. In this way, the present invention can provide an RF return path for legacy video service terminals that shares a return path for regular data packets in an optical network architecture. Video service terminals can comprise set top terminals or other like communication devices that may employ RF carriers to transmit upstream information.

The present invention also provides a way in which the upstream transmission timing scheme that is controlled by the legacy video service controller housed within the data service hub is preserved. The upstream transmission timing scheme generated by the legacy video service controller is usually designed to eliminate any collisions between RF signals produced by different video service terminals. The present invention can operate independently of this legacy upstream transmission timing scheme so that the legacy upstream transmission timing scheme can remain effective. The present invention can also adjust the transmission rate of RF packets during certain stages in an optical network in order to take advantage of lower cost hardware.

In an alternate exemplary embodiment, the present invention allows for less complex hardware that can be provided in the subscriber optical interface or laser transceiver node or both for subscribers that are not taking data services.

In other alternative exemplary embodiments, an optical signal present line in combination with a driver may be employed in order to reduce the amount of hardware in a laser transceiver node. In such an embodiment, the optical signal present line can also function to detect a new terminal as it is added to the optical network.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that houses a legacy video services controller 115. The legacy video services controller 115 is typically designed to transmit and receive digital radio-frequency (RF) signals. The legacy video services controller 115 can comprise conventional hardware that supports services such as impulse-pay-per-view and video-on-demand. However, the video services controller 115 is not limited to the aforementioned applications and can include other applications that are not beyond the scope and spirit of the present invention. In some exemplary embodiments, the video services controller can be split between two locations. For example, a portion, primarily a computer, can be located in a first data service hub 110 that services a plurality of second data service hubs 110, while an RF transmitter plus one or more receivers can be located in each second data service hub 110. The first and plurality of second data service hubs 110 can be linked using any of several known communications paths and protocols.

The data service hub 110 is connected to a plurality of outdoor laser transceiver nodes 120. The laser transceiver nodes 120, in turn, are each connected to a plurality of optical taps 130. The optical taps 130 can be connected to a plurality of subscriber optical interfaces 140. Connected to each subscriber optical interface 140 can be video services terminal (VST) 117. The video services RF terminal 117 is designed to work with the video services controller 115. The video services RF terminal 117 can receive control signals from the video services controller 115 and can transmit RF-modulated digital signals back to the video services controller 115. The RF-modulated digital signals may comprise the options selected by a user. However, the signals produced by the video service terminal 117 could be analog in form and then modulated onto the RF carrier. But most legacy video service terminals 117 as of the writing of this description produce digital signals that are modulated onto an analog RF carrier.

The video services terminal 117 can permit a subscriber to select options that are part of various exemplary video services such as impulse-pay-per-view and video-on-demand. However, as noted above with respect to the video services controller 115, the present invention is not limited to the aforementioned applications and can include numerous other applications where RF analog signals are used to carry information back to the video services controller 115.

Between respective components of the exemplary optical network architecture 100 are optical waveguides such as optical waveguides 150, 160, 170, and 180. The optical waveguides 150–180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the RF return system of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hand hole." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120. The RF system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIGS. 5, 6, and 7.

In one exemplary embodiment of the present invention, three trunk optical waveguides 160, 170, and 180 (that can comprise optical fibers) can propagate optical signals from the data service hub 110 to the outdoor laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast video and control signals generated by the video services controller 115. The signals can be carried in a traditional cable television format wherein the broadcast signals are modulated onto carriers, which in turn, modulate an optical transmitter (not shown in this Figure) in the data service hub 110. The first optical waveguide 160 can also carry upstream RF signals that are generated by respective video service terminals 117. Further details of the format of the upstream RF signals will be discussed below.

A second optical waveguide 170 can carry downstream targeted services such as data and telephone services to be delivered to one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 connected between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor laser transceiver node 120. In one exemplary embodiment, six optical fibers 150 are designed to be connected to the outdoor laser transceiver node 120. Through the use of the optical taps 130, sixteen subscribers can be assigned to each of the six optical fibers 150 that are connected to the outdoor laser transceiver node 120.

In another exemplary embodiment, twelve optical fibers 150 can be connected to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, both the first optical waveguide 160 and the second optical waveguide 170 support bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a first combiner 320A. The control signals from the video services controller 115 are modulated on an RF carrier by an RF transmitter 303. The RF transmitter 303 feeds its downstream analog RF electrical signals into a second combiner 320B where the electrical signals from the two modulators 310, 315 are combined. The combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, the two combiners 320A and 320B may actually be one and the same combiner. Also, video signals may be generated at another data service hub 110 and sent to the data service hub 110 of FIG. 3 using any of a plurality of different transmission methods known to these skilled in the art. For example, some portion of the video signals may be generated and converted to optical form at a remote first data service hub 110. At a second data service hub 10, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated through a diplexer 420 out of the data service hub 110 via a bi-directional video signal input/output port 335 which is connected to one or more first optical waveguides 160.

The bi-directional video signal input/output port 335 is connected to one or more first optical waveguides 160 that support bi-directional optical signals originating from the data service hub 110 and video services terminals 117. The diplexer 420 disposed adjacent to the bi-directional video signal input/output port 335 separates upstream digital, optical RF packets originating originated by the video service terminals 117 from downstream analog optical RF video service control signals and broadcast video signals.

The upstream digital, optical RF packets are fed into an optical receiver 370 where the upstream optical RF packets are converted from the optical domain into the electrical domain. The optical receiver 370 can comprise one or more photoreceptors or photodiodes that convert optical signals into electrical signals.

Coupled to the optical receiver 370 is a delay generator 305 that can substantially reduce or eliminate any latency or jitter in the upstream RF packets. Further details of the delay generator will be discussed below with respect to FIG. 4. The delay generator 305 feeds into a data-to-RF converter 307 that transforms RF packets back into their original RF analog electrical format. Further details of RF converter 307 will be discussed below with respect to FIG. 11. The RF analog electrical signals generated by the data-to-RF converter 307 are demodulated by an RF receiver 309. The demodulated signals are then propagated to the video services controller 115.

The data service hub 110 illustrated in FIG. 3 can further comprise an Internet router 340. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional methods of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

The laser transceiver node routing device 355 can supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bi-directional optical data signals between the data service hub 110 and a respective laser transceiver node 120.

Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
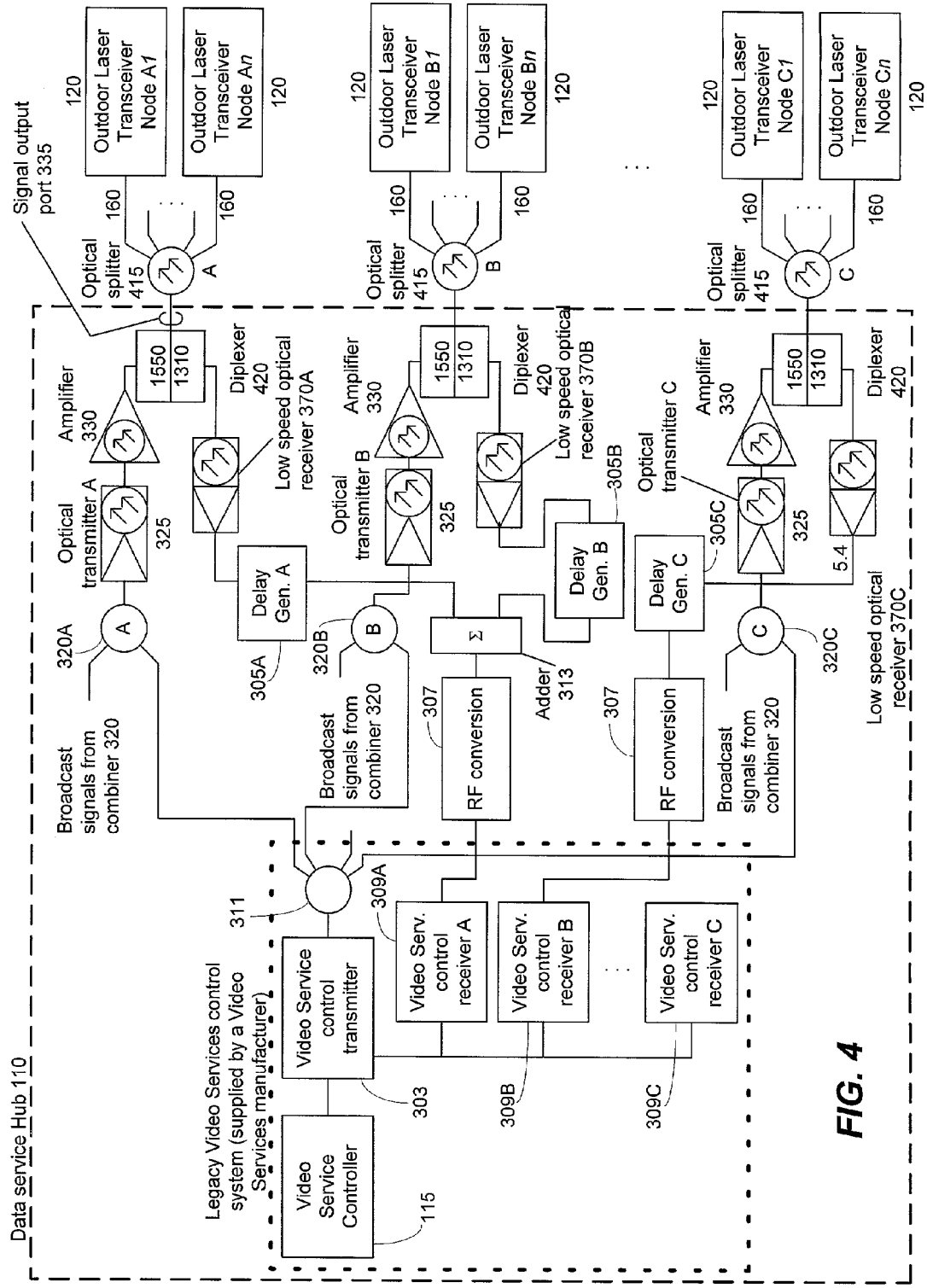
FIG. 4 is a functional block diagram illustrating an exemplary data service hub of the present invention that is designed to support multiple transceiver nodes.

Referring now to FIG. 4, this Figure illustrates a functional block diagram of an exemplary data service hub 110 that provides additional detail of hardware that supports multiple upstream RF signals originating from multiple video service terminals 117. The details of the hardware handling regular downstream and upstream data is omitted from FIG. 4. Only the differences between FIG. 4 and FIG. 3 will be discussed below.

An electrical splitter 311 is coupled to the video service control RF transmitter 303. The electrical splitter 311 divides the video service control signals between combiners 320A, 320B and 320C. Broadcast signals from other combiners 320 are also fed into the aforementioned combiners 320A, 320B and 320C.

The electrical splitter 311 can divide the output of the video service control RF transmitter 303 to provide control signals to a plurality of optical nodes 120 and ultimately a plurality of video service terminals 117. Each laser transceiver node 120 can serve at least 96 subscribers.

The output of each combiner 320A, 320B and 320C is fed into a respective optical transmitter 325, which in turn, is fed into an optical amplifier 330. The signals from each optical amplifier are fed into a respective diplexer 420. Each diplexer 420 allows a respective optical wave guide 160 to propagate bi-directional signals on at least two different wavelengths. And in one exemplary embodiment, the downstream broadcast and control signals are carried at 1550 nanometers. Upstream RF packets associated with the video service terminals 117 can be propagated at 1310 nanometers. An optical splitter 415 splits the downstream optical signals to serve a number of outdoor laser transceiver nodes 120. In another exemplary embodiment (not shown) Diplexer 420 can be omitted, and two fiber strands are used to carry the data in the two directions.

Upstream optical RF packets are combined in the optical splitter 415. In diplexer 420, the upstream optical RF packets are separated from the downstream optical signals. The diplexer 420 may comprise a wave division multiplexer or other like structures.

From the diplexer 420, the upstream RF data packets are converted into the electrical domain with an optical receiver 370. The electrical RF data packets are then forwarded to a respective delay generator 305. The output of each respective delay generator 305 is fed into an adder 313 if multiple laser transceiver nodes 120 are being serviced by a respective video service control receiver 309. Specifically, an adder 313 enables multiple transceiver nodes to be handled by respective individual data-to-RF converters 307 and video service control receivers 309. The adders 313 can reduce the amount of hardware needed by the video service controller 115 to manage multiple subscribers.

Figure 5:
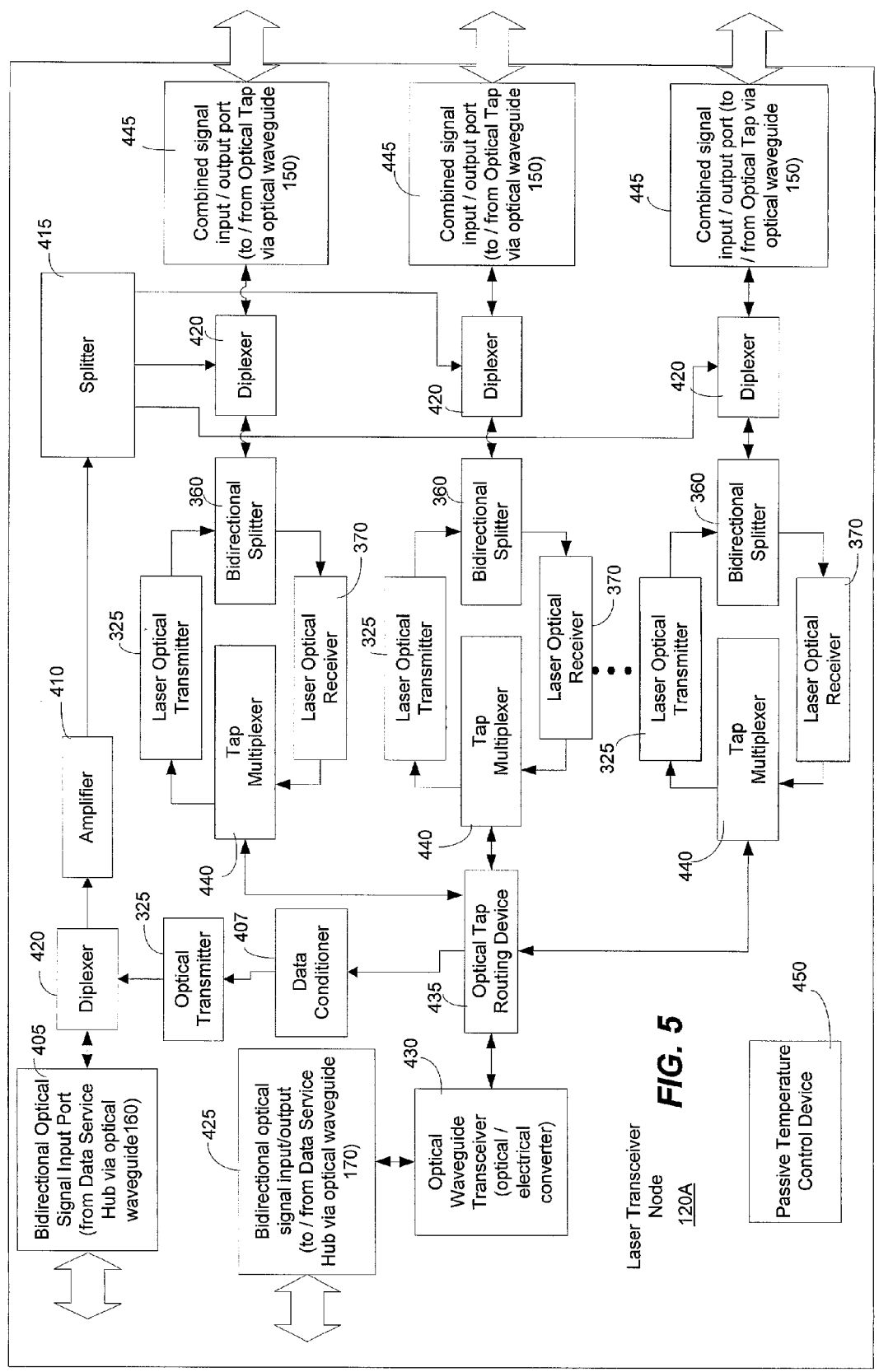
FIG. 5 is a functional block diagram illustrating an exemplary transceiver node according to the present invention.

Referring now to FIG. 5, this Figure illustrates a functional block diagram of an exemplary outdoor laser transceiver node 120 of the present invention. In this exemplary embodiment, the laser transceiver node 120A can comprise a bi-directional optical signal input port 405 that can receive optical signals propagated from the data service hub 110 that are propagated along a first optical waveguide 160. The optical signals received at the bi-directional optical signal input port 405 can comprise downstream broadcast video data, downstream video service control signals, and upstream RF packets.

The downstream optical signals received at the input port 405 are propagated through a diplexer 420 to an amplifier 410 such as an Erbium Doped Fiber Amplifier (EDFA) in which the optical signals are amplified. The amplified optical signals are then propagated to an optical splitter 415 that divides the downstream broadcast video optical signals and video service control signals among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets as they arrive, by each tap multiplexer 440. The optical tap routing device is connected to each tap multiplexer 440 to receive these upstream data and RF packets. The optical tap routing device 435 relays the packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The optical tap routing device 435 can separate upstream data packets from upstream RF packets. The optical tap routing device 435 sends upstream data packets to the optical waveguide transceiver 430 and RF packets to a data conditioner 407. The data conditioner 407 can comprise a buffer such as a FIFO. A FIFO is a special purpose circuit known to those skilled in the art. It takes in data at an interstitial burst rate, then puts out the data ("plays it out") at the slower clock frequency that corresponds to the rate at which it was supplied. A FIFO can begin transmitting data as soon as it begins receiving the data, because it is assured of getting data in data at a fast enough rate that it will not run out of data before it completes sending the packet.

Therefore, the data conditioner 407 of the laser transceiver node 120 can slow down the transmission speed of the upstream RF packets. For example, the upstream RF packets may enter the data conditioner 407 at a transmission speed of 500 Megabits per second (Mbps) and exit the data conditioner at a transmission speed of 40 Megabits per second. However, the present invention is not limited to these exemplary transmission rates. For example, the exit transmission speed may comprise a rate of 25 Megabits per second. But other transmission rates that are faster or slower than those described are not beyond the scope of the present invention.

By slowing the transmission speed of the upstream RF packets, the data conditioner 407 offers several advantages. One advantage is that the relatively slow upstream transmission rate allows the use of lower power optical transmitters 325. That is, while optical transmitter 325 connected to the data conditioner 407 may comprise one of a Fabry-Perot (F-P) laser, a distributed feedback laser (DFB), or a Vertical Cavity Surface Emitting Laser (VCSEL), other lower power lasers can be used. Those skilled in the art recognize that lower power lasers are typically lower in cost compared to high power lasers. The optical transmitter 325 can transmit the upstream RF packets in the 1310 nanometer wavelength range.

Referring back to the optical tap routing device 435, the aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or, tap multiplexer 440) is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which tap multiplexer 440 propagated an upstream optical signal (that is received as an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports. Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045,584.

The single ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 525 and laser optical receiver 370. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 6:
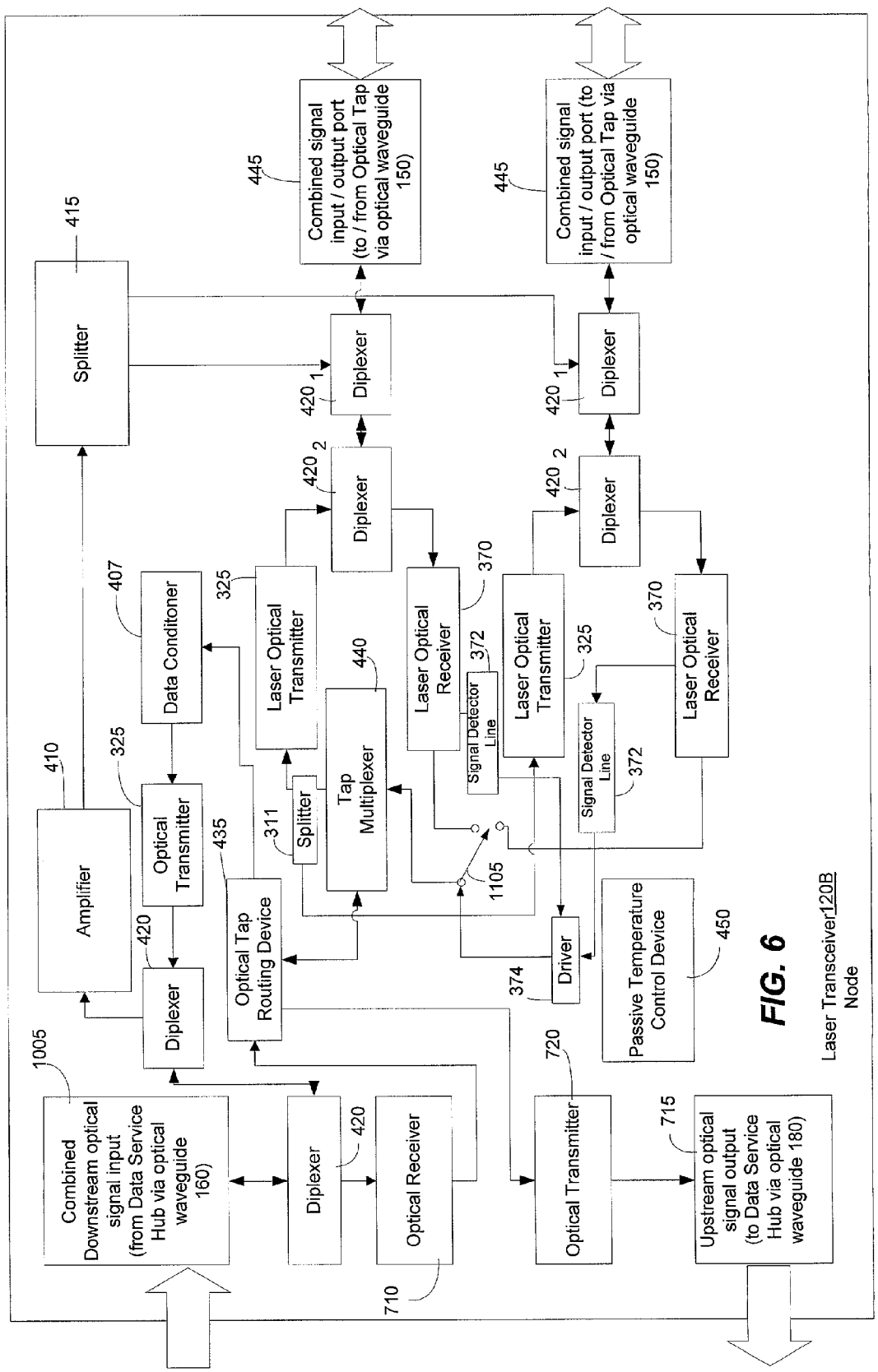
FIG. 6 is a functional block diagram illustrating an alternate exemplary embodiment of transceiver node according to the present invention where multiple laser optical receivers share an optical tab multiplexer.

FIG. 6 is a functional block diagram illustrating another exemplary outdoor laser transceiver node 120B that employs dual transceivers between tap multiplexers 440 and respective groups of subscribers. In this embodiment the downstream optical signals originating from each respective tap multiplexer 440 are split immediately after the tap multiplexer 440. In this exemplary embodiment, each optical transmitter 325 is designed to service only eight subscribers as opposed to sixteen subscribers of other embodiments. But each tap multiplexer 440 typically services sixteen or fewer subscribers.

In this way, the splitting loss attributed to the optical taps 130 placed further downstream relative to the tap multiplexers 440 can be substantially reduced. For example, in other exemplary embodiments that do not split the downstream optical signals immediately after the tap multiplexer 440, such embodiments are designed to service sixteen or fewer subscribers with a corresponding theoretical splitting loss of approximately 14 dB (including an allowance for losses). With the current exemplary embodiment that services eight or fewer subscribers, the theoretical splitting loss is reduced to approximately 10.5 dB.

In laser transceiver node 120B, the outputs of two optical receivers 370 cannot be paralleled because at all times one receiver 370 or the other is receiving signals from respective subscribers, while the other receiver 370 is not receiving signals. The receiver 370 not receiving any upstream optical signals could output noise which would interfere with reception from the receiver 370 receiving upstream optical signals. Therefore, a switch 1105 can be employed to select the optical receiver 370 that is currently receiving an upstream optical signal. The tap multiplexer 440 can control the switch 1105 since it knows which optical receiver 370 should be receiving upstream optical signals at any given moment of time.

However, since the RF return system of the present invention preserves the data collision detection scheme of the legacy video services controller 115, there may be instances when the tap multiplexer 440 is not aware of upstream RF packets. In other words, since the tap multiplexer 440 operates independently of the video services controller 115, it does not have any information about the sequence in which video service terminals 117 are transmitting upstream RF information. Also, the tap multiplexer 440 may not be aware of new subscriber optical interfaces 140 that are added to the system and who are not registered with the tap multiplexer 440. In these scenarios, the tap multiplexer 440 may not know in which position to place switch 1105. A serializer/deserializer circuit (SERDES—not shown but known to those skilled in the art) that typically follows the switch 1105 and is part of tap multiplexer 440, may loose synchronization if it doesn't receive a signal for some short length of time.

Therefore, each optical receiver 370 may comprise a signal detector line 372 that is coupled to a driver 374. The driver 374 is connected to the switch 1105. The signal detector line 372 may comprise hardware built into a respective optical receiver that is designed to detect a presence of an optical signal as it enters a respective optical receiver 370. The signal detector line 372 is typically designed to check for the presence of an optical signal during very short intervals that are usually smaller than the interstitial intervals (the time between transmissions of multiple RF packets from different subscriber optical interfaces 140).

Figure 7:
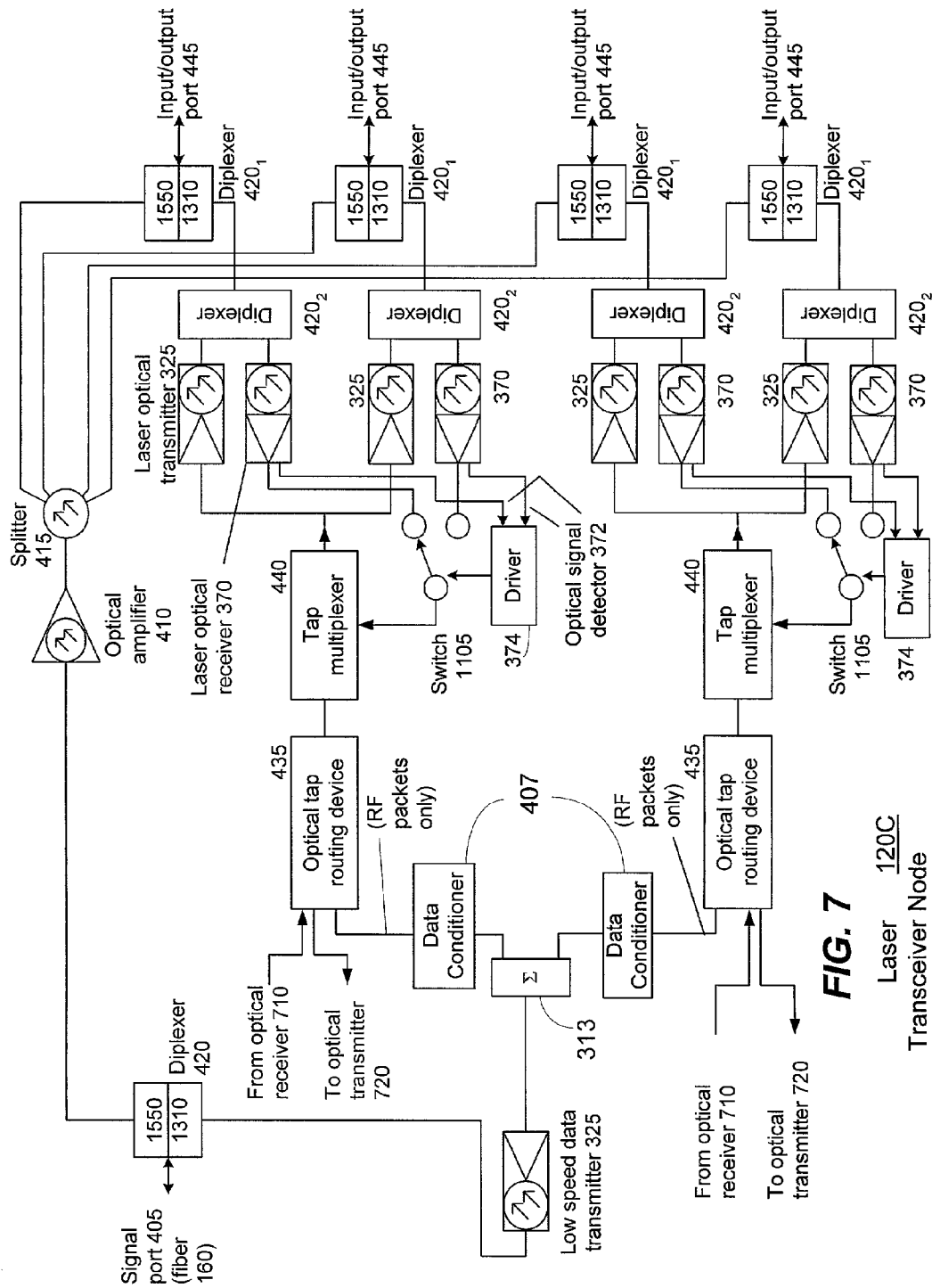
FIG. 7 is a functional block diagram illustrating another transceiver node according to the present invention where the transceiver node comprises a plurality of tap multiplexers and associated upstream data transmissions.

Referring now to FIG. 7, this Figure illustrates a functional block diagram of an exemplary laser transceiver node 120C that provides additional detail of hardware that supports multiple RF packets originating from multiple video service terminals 117. Only the differences between FIG. 6 and FIG. 7 will be discussed below.

RF packets from the subscriber optical interfaces 140 typically enter the laser transceiver node 120 as a burst, located in time between other types of regular upstream packet data. The RF packets are separated from the other upstream packet data in the optical tap routing device 435. The RF packets are slowed down by a respective data conditioner 407, and then are applied to an adder 313, which combines all data bursts regardless of which optical tap routing device 435 forwarded the RF packets. Since only one return path is active at a time, by virtue of the management of time slots by the video services controller 115, then all inputs to the adder 313 are zero except the active input.

It is noted that the conversion from digital RF packets to analog RF signals will not take place until the RF packets are received at the data service hub 110. As noted above, the RF packets are slowed down at the laser transceiver node 120 to reduce the demands on the transmission path back to the data service hub 110.

Figure 8:
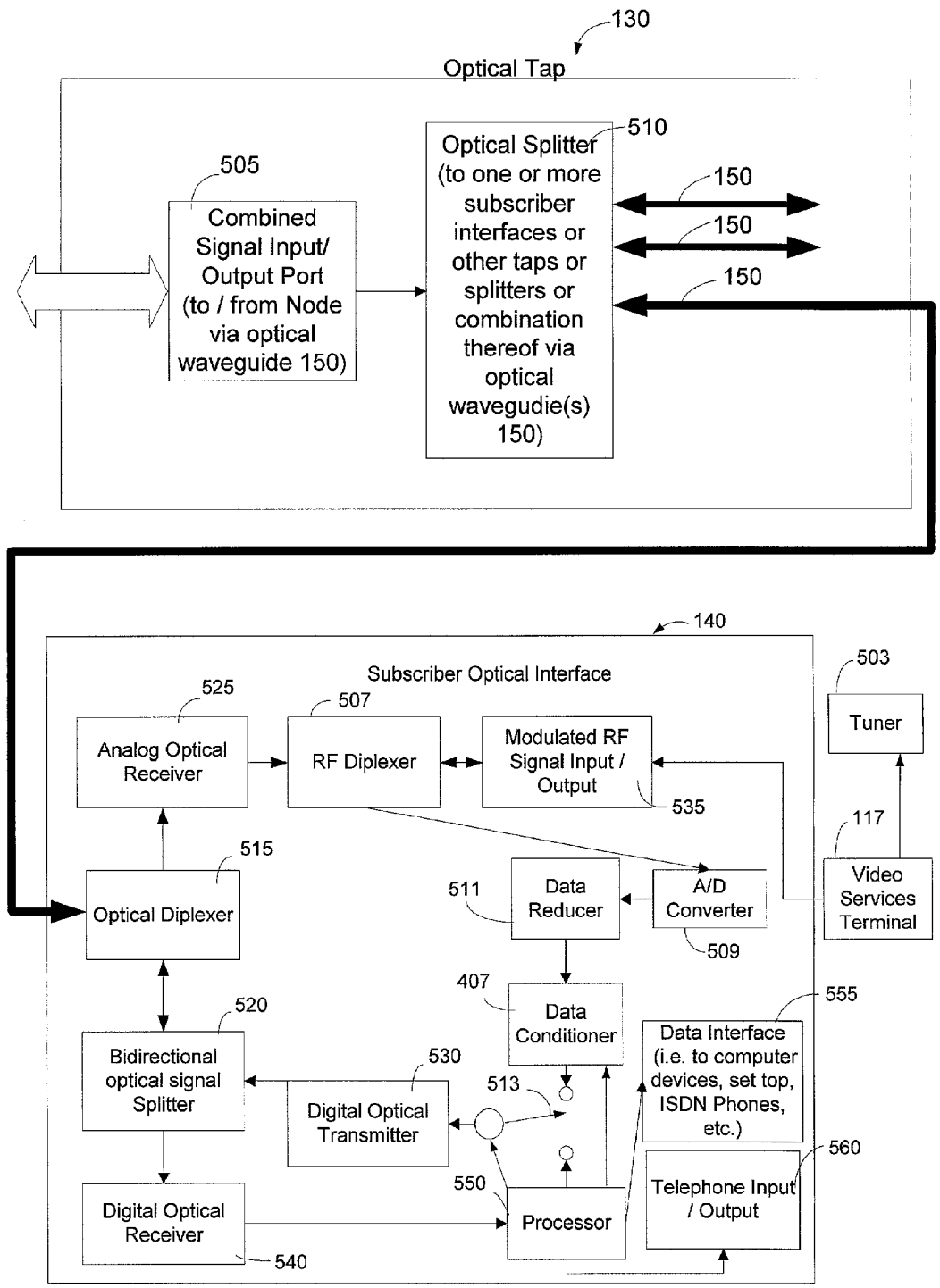
FIG. 8 is a functional block diagram illustrating an optical tap connected to a subscriber optical interface by a signal wave guide according to one exemplary embodiment of the present invention.

Referring now to FIG. 8, this Figure is a functional block diagram illustrating an optical tap 130 connected to a subscriber optical interface 140 by a single optical waveguide 150 according to one exemplary embodiment of the present invention. The optical tap 130 can comprise a combined signal input/output port that is connected to another distribution optical waveguide that is connected to a laser transceiver node 120. As noted above, the optical tap 130 can comprise an optical splitter 510 that can be a 4-way or 8-way optical splitter. Other optical taps having fewer or more than 4-way or 8-way splits are not beyond the scope of the present invention.

The optical tap 130 can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of optical waveguides so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 with respect to another exemplary embodiment (not shown).

The subscriber optical interface 140 functions to convert downstream optical signals received from the optical tap 130 into the electrical domain that can be processed with appropriate communication devices. The subscriber optical interface 140 further functions to convert upstream data and RF packet electrical signals into upstream optical signals that can be propagated along a distribution optical waveguide 150 to the optical tap 130.

The subscriber optical interface 140 can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals such as upstream data packets and RF packets to optical form so that the optical signals can be transmitted back to the data service hub 110. Conversely, the digital optical receiver 540 converts optical signals into electrical binary/digital signals so that the electrical data signals can be handled by processor 550. Processor 550 can comprise an application specific integrated circuit (ASIC) in combination with a central processing unit (CPU). However, other hardware implementations are not beyond the scope and spirit of the present invention.

The RF return system of the present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals and downstream video service control signals into analog RF signals that are propagated through an RF diplexer 507 and out of the modulated RF signal input/output 535. The modulated RF bidirectional signal input/output 535 can feed into the video services terminal 117. The video services terminal 117 can be coupled to a tuner 503 that comprises a television set or radio. The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream data packet and RF packet electrical signals into the optical domain.

The digital optical receiver 540 can comprise one or more photoreceptors or photodiodes that convert optical signals into the electrical domain. The digital optical transmitter 530 can comprise one or more lasers such as the Fabry-Perot (F-P) Lasers, distributed feedback lasers, and Vertical Cavity Surface Emitting Lasers (VCSELs). Other types of lasers are within the scope and spirit of the invention.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 560 that can comprise an analog interface. The processor 550 is also connected to a data interface 555 that can provide a link to computer devices, ISDN phones, and other like devices. Alternatively, the data interface 555 can comprise an interface to a Voice over Internet Protocol (VoIP) telephone or Ethernet telephone. The data interface 555 can comprise one of Ethernet (10BaseT, 100BaseT, Gigabit) interface, HPNA interface, a universal serial bus (USB) an IEEE1394 interface, an ADSL interface, and other like interfaces.

When the video services terminal 117 generates RF signals, these RF signals are propagated through the modulated RF signal input/output 535 to the diplexer 507. The diplexer 507 passes the upstream analog RF signals to an analog-to-digital (A/D) converter 509. From the A/D converter 509, the digital RF signals are passed to a data reducer 511. Further details of the data reducer 511 will be discussed below with respect to FIG. 10*a*. The reduced RF signals are then propagated to a data conditioner 407. The data conditioner 407 at this stage can speed up data transmission of the RF signals. The data conditioner 407 can comprise a buffer such as a FIFO that also inputs a time stamp and identification information with the digitized RF signals to form RF packets. That is, an RF packet can comprise digitized and reduced RF signals that are coupled with identification and timing information. Reduced RF signals may enter the data conditioner 407 at an exemplary transmission speed of 40 Megabits per second (Mps) while the newly formed RF packets exit the data conditioner 407 at an exemplary transmission speed of 500 Megabits per second (Mps). However, other transmission speeds are not beyond the scope of the present invention.

RF packets are transferred upstream from the data conditioner 407 when a switch 513 connects the data conditioner 407 to the digital optical transmitter 530. The switch 513 is controlled by processor 550. When switch 513 is not connected to the data conditioner 407, it can connect the output of the processor 550 to the digital optical transmitter 530. In other words, the switch 513 may be activated at appropriate times to combine the upstream RF packets from the data conditioner 407 with upstream data packets from the processor 550 destined for the data service hub 110. More specifically, the RF packets may be inserted between upstream packets comprising data generated by a subscriber with a communication device such as a computer or telephone. The insertions between regular upstream data packets are referred to as "intersititals" as will be discussed in further detail below with respect to FIGS. 13 and 14.

In one exemplary embodiment, the regular upstream data packets are kept in tact meaning that the processor 550 determines what upstream data packets can fit between the interstitials. In other words, in one exemplary embodiment, the processor 550 does not break any upstream data packets. However, in another exemplary embodiment (not shown), it is possible for processor 550 to break or separate upstream packets into smaller packets so that they will fit between the interstitials. Since the breaking and reforming of packets is known to those skilled in the art, a detailed discussion of packet breaking and reforming methods will not be discussed herein.

The insertion of RF packets between regular data packets for upstream transmission is yet one important feature of the invention. In other words, the timing at which the RF packets are inserted between upstream data packets for upstream transmission is one inventive aspect of the present invention. The amount of time between RF packet transmissions is typically smaller than the amount of time allotted for the production of the analog RF signal produced by the video service terminal 117.

Stated differently, the size of the RF signal produced by the video service terminal 117 as measured in time is usually greater than the amount of time between upstream transmissions of a pair of RF packets. While the upstream transmission of data packets is interrupted at intervals with upstream RF packet transmission, it is noted that the intervals of interruption do not need to be regularly spaced from one another in time. However, in one exemplary embodiment, the interruptions are designed to be spaced at regular, uniform intervals from one another. With the present invention, the upstream transmission of RF packets can occur with very low latency and jitter.

It is noted that the switch 513 of each subscriber optical interface 140 is activated at the same time. In other words, each switch 513 of each subscriber optical interface 140 checks for RF packets from a respective data conditioner 407 at the same time. While such functionality may appear to contribute to possible data collisions between respective video service terminals 117, the video service controller 115 actually prevents any data collisions between respective RF packets of different subscriber optical interfaces 140. That is, another unique feature of the RF return system of the present invention is that the timing between legacy video service terminal transmissions is typically not controlled by the present invention.

The RF return system of the present invention actually preserves the upstream transmission timing scheme that is controlled by the legacy video service controller 115 that is housed within the data service hub 110. The upstream transmission timing scheme generated by the legacy video service controller 115 is designed to eliminate any collisions between RF signals produced by different video service terminals 117. The present invention operates independently of this legacy upstream transmission timing scheme so that the legacy upstream transmission timing scheme can remain effective.

Figure 9:
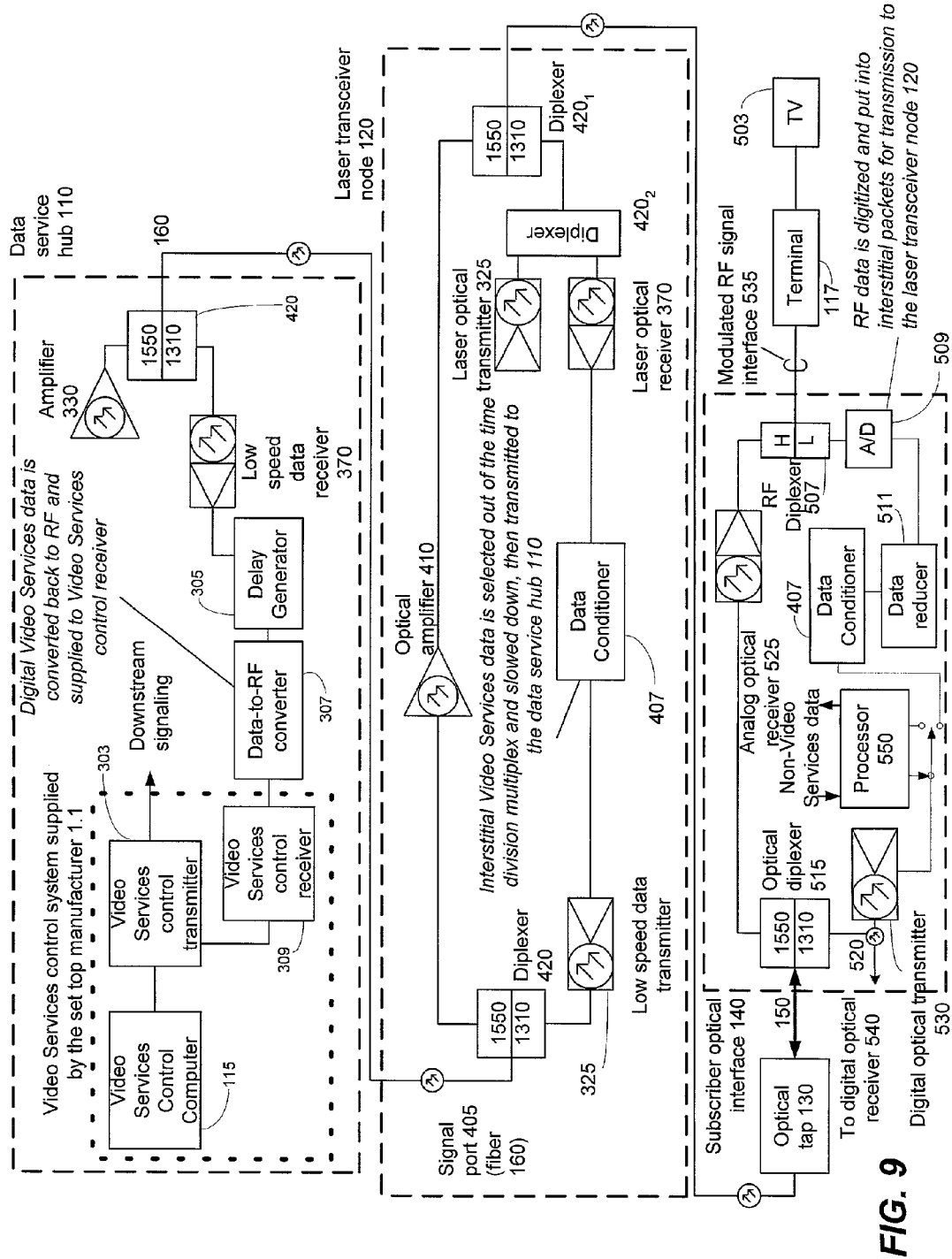
FIG. 9 is a functional block diagram illustrating an overview of several of the main components according to one exemplary embodiment of the present invention.

Referring now to FIG. 9, this Figure illustrates a functional block diagram of an overview of the aforementioned architecture that forms the RF return path for RF signals originating from a video service terminal 117. The RF signals to be returned from the video service terminal 117 in a subscriber's home is propagated towards the modulated RF input/output signal interface 535 near the lower right corner of the subscriber optical interface 140. Each RF return signal can comprise a frequency that exists between an exemplary range of 5 and 42 MHz in North America. The RF signal can comprise an occasional burst of RF modulated data, which must be transported back to the headend. Because of certain design parameters of legacy video service systems that work according DVS 167 and DVS 178 standards, it is recommended that the modulated RF signal be delivered back to the data service hub 110 in a time frame comprising approximately one millisecond. However, other time frames of different magnitudes are not beyond the scope of the present invention.

The modulated RF signal between 5 and 42 MHz generated by the video service terminal 117 is routed to the low frequency port of an RF diplexer 507. This signal is digitized in A/D converter 509, processed in the data reducer 511 and data conditioner 407. While in the data reducer 511, certain algorithms are applied to reduce the amount of data transmitted. A number of algorithms related to subsampling and other techniques are known to those skilled in the art. Further details of the data reducer 511 will be discussed below with respect to FIG. 10*a*.

Then during an interstitial time period, a switch 513 connects the data conditioner 407 to the digital optical transmitter 530. During this connection, the RF packets are transmitted upstream with the digital optical transmitter 530. The present invention is not limited to a discrete switch 513 as described above. The switch functionality may be incorporated into the processor 550 or other appropriate hardware device in the subscriber optical interface 140.

At the laser transceiver node 120, both upstream data packets and RF packets are received in laser optical receiver 370, which receives data from a number of different subscriber optical interfaces 140. In the data conditioner 407 of the laser transceiver node 120, the RF packets are slowed to the speed at which they will ultimately be converted back to analog RF signals. The RF packets are supplied to a low speed data transmitter 325, which transmits the digital RF packets from all video service terminals 117 back to the data service hub 110, via an optical diplexer 420.

At the data service hub 110, the RF optical packets are received and converted into the electrical domain by a low speed data receiver 370, and then are converted to analog RF signals in the data-to-RF converter 307, and supplied to the video services control receiver 309. The video service control receiver 309 demodulates the analog RF signals and passes them to the video service controller 115. One key feature of the invention is the recognition that the video service controller 115 itself will manage time slots for video service terminal 117, ensuring that no two RF data packets using the same video service control receiver 309, will transmit at the same time. Because of this characteristic, it is not necessary for the system of the present invention to manage time slots for the video service terminals 117.

An alternative exemplary embodiment (not shown) that is useful in certain situations, is to use a separate fiber for upstream transmission, allowing the elimination of diplexers 420 in both the laser transceiver node 120 and data service hub 110, and reducing the losses of the downstream signals on fiber 160.

Referring now to FIG. 10*a*, this figure illustrates a functional block diagram that describes further details of a data reducer 511. The RF signals produced by each video service terminal may comprise signals that bear digital modulation usually but not necessarily QPSK modulation. These RF signals are supplied from the video service terminal 117 to RF diplexer 507, which separates the higher-frequency downstream RF signals from the lower-frequency upstream signals. The lower frequency upstream signal typically comprises a single limited-bandwidth RF signal. It is one object of the present discussion to capture this analog RF signal, convert it to digital form and relay it back to the headend, where it is converted back to an analog RF signal that can be received by a video service control receiver 309.

Data from the low port of RF diplexer 507 is supplied to an RF signal detector 517, which determines when an analog RF signal is present. When a signal appears, RF signal detector 517 notifies a controller 519 of the presence of the signal, and controller 519 initiates a series of steps. Controller 519 receives time stamps from laser transceiver node 120. The time stamp can comprise a sequential word that is transmitted from laser transceiver node 120, related to a time-keeping function performed in laser transceiver node 120. Normally, the controller 519 discards a time stamp as soon as the next one is received. However, if RF signal detector 517 detects an RF signal coming from the video service terminal 117, then the time stamp that applies at that instant is passed on to data conditioner 407, for incorporation in the RF packet data output. This function will be described below.

When an RF signal is received and detected by RF signal detector 517, then it is converted to digital form in A/D converter 509. Prior to being converted to digital form, it is sampled in the sample-and-hold function, switch 521 and hold capacitor 523. This sample and hold function is well-known to those skilled in the art. Switch 521 is closed periodically, resulting in the voltage on the low port of diplexer 507 being transferred to capacitor 523. Then switch 521 is opened, and the voltage remains on capacitor 523 while A/D converter 509 converts the voltage to a digital word. The digital word typically must comprise a minimum number of bits in order to provide an adequate signal-to-noise ratio (S/N) for recovering the data, as is understood by those skilled in the art.

For recovery of QAM, it is estimated that four bits will yield an adequate S/N. However, this assumes that the signal occupies the entire four bit range. If the signal is too low in amplitude it will not be transmitted at reasonable S/N, and if the signal is of too great an amplitude, it will clip the A/D converter 509 and will fail to supply a useable signal to RF video service control receiver 309. The video service terminal control system described in DVS 167 and DVS 178 includes the ability to smooth the video service terminal output to the required level or amplitude, but when a video service terminal 117 is first added to the system, its level is not correct. Thus, the A/D must have adequate range to digitize the signal even if it is at the incorrect amplitude.

Those skilled in the art know that the minimum rate at which the signal can be sampled is twice the highest frequency of the signal being sampled. This limitation is known as the Nyquist sampling theorem. This is illustrated in FIG. 10*b* that depicts a graph 526. The sampling frequency, $f_S$, at which switch 521 is cycled, usually must be more than twice the highest frequency in the RF return signal. This highest frequency is represented by $f_H$. Thus, the sampling frequency $f_S$ must be equal to or greater than 2 times $f_H$.

The data rate needed to support data transmission is given by the product of the sampling frequency $f_S$ and the number of bits transmitted, n. Thus, if 8 bits are needed to transmit an adequate S/N (allowing for errors in signal level), and f=15 MHz, the minimum data rate is 2×15×8, or 240 Mb/s. In practice, a higher data rate must be used, to compensate for limitations of real filters. Two methods are used to reduce the data rate that must be transmitted. First, the frequency of the signal is reduced, then the number of bits of data is reduced by scaling the amplitude of the digitized signal (data scaling). These methods will be explained below.

After A/D converter 509, the digital signal is propagated to the data conditioner 511. The data conditioner 511 can comprise a down conversion processing unit 527 and a low pass filter 529. Down conversion processing unit 527 comprises a mixing (multiplication) process that takes place in the digital domain. This function may also be implemented in the RF domain before switch 521, as is understood by those skilled in the art. In the down conversion unit 527, each sample of the digitized signal is multiplied by a number representing a sinusoidal waveform. The number representing a sinusoidal waveform is generated in the digital domain, $f_{LO}$ 531, as illustrated in FIG. 10c, and is the local oscillator signal shown in the small spectrum diagram near the bottom of FIG. 10c.

As is understood by those skilled in the art, when the RF return signal is mixed with $f_{LO}$ 531, either in the digital domain shown or in the RF domain, several components are generated. These include the difference signal 533, the sum signal 534, and a number of harmonics 536. All of these components with the exception of the difference 533, are removed by low pass filter 529, whose shape is shown by the dashed line 537. As is understood by those skilled in the art, it is sometimes possible to set $f_{LO}$ equal to the carrier frequency of the incoming signal (usually equal to $(f_H-f_L)/2$). This can result in the lowest possible data rate.

Since the frequency of the sampled signal is now lower, being the difference frequency 533, the number of times the signal is sampled may be reduced without violating the Nyquist sampling theorem. This operation is performed in sample elimination unit 538, which removes unnecessary samples. In a simple case, this function may be performed by simply dropping every other sample point, or by dropping two of three sampling points, etc. In a more sophisticated sample reduction algorithm, the sampling rate may be reduced by choosing sampling times and interpolating between samples of the incoming signal. This technique is understood by those skilled in the art.

The data scaling unit 539 removes unnecessary numbers of bits from each sample, while maintaining the maximum scaling of the data. The technique is familiar to those skilled in the art, and for example has been used in the British NICAM (Near Instantaneous Compression and Modulation) method of transmitting digital audio information on an analog channel.

FIG. 10d illustrates one exemplary data scaling algorithm 1000 that can be performed by data scaling unit 539. The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

FIG. 10d uses an example of reducing an 8 bit sample down to 4 bits, though other reductions can be used and are not beyond the scope of the present invention. The algorithm starts at step 1005. A counter, called an MSB (most significant bit) counter is used in the routine to keep track of the number of places on the left of a data word have been eliminated, as will be evident from the description below. The MSB counter is initially set to a count of 0 in step 1010.

In step 1015, a block of data, such as, but not limited to, thirty-two 8-bit bytes, are read and processed. Within that block of data, each sample is examined in step 1020 to determine if the MSB is a 1 or a 0. If all samples in the block have a 0 in the MSB position, then the inquiry to decision step 1020 is answered "No", meaning that the MSB is not used in any data in that set of bytes. If the inquiry to decision step 1020 is negative, then the "No" branch is followed to step 1025 in which the data may be shifted left. At the same time, the MSB counter referred to above is incremented by 1, to keep track of how many times the block has been shifted. Operation then returns to decision step 1020, which again decides whether the MSB is used. If not, then the process repeats through step 1020, until the MSB is used.

Note that this process applies to all the data words in the block of data being processed.

When the MSB is used, then the inquiry to decision step 1020 is positive and the "Yes" branch is followed to step 1030 in which the least significant four bits of the word are dropped. Thus, the routine 1000 has caused the retention of the four most significant bits that have data, in the block of data. These bits are transmitted in step 1035 along with the state of the MSB counter, which is used to reconstruct the waveform at the data service hub 110.

Referring now to FIG. 11a, this figure illustrates a functional block diagram that describes further details of a data-to-RF converter 307. The time stamp that is added by the data conditioner 407 in the subscriber optical interface 140 controls initiation of the analog RF signal recovery process discussed below. That time stamp is either operative in the data-to-RF converter 307 of the data service hub 110, or in the data conditioner 407 of the laser transceiver node 120. Either place is satisfactory.

When the RF packets are returned to the data-to-RF converter 307 at the data service hub 110, they usually must be restored to their original form. In the scaling restoration unit 317, the data scaling of the RF analog signals represented in the RF packet is restored, reversing the actions performed by the data scaling unit 539 of the data reducer 511.

FIG. 11b illustrates the scaling restoration process. Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope, and spirit of the present invention.

The restoration process starts at step 1105. The value of the MSB counter is read in step 1110, then data is read in 1115. For each data word, the data is shifted right by the MSB counter value in step 1120, with leading zeros being added to the left of the transmitted bits. Thus, the value that was originally developed in the sample elimination unit 538, is restored. Of course, if fewer than the four most significant bits in the original word have been dropped, then some least significant bits are converted to zero by the process, but they represent only small errors in the recovered signal, and are tolerable.

In decision step 1125, it is determined whether all of the data the current transmission or block has been read. If the inquiry to decision step 1125 is negative, then the "No" branch is followed back to step 1115. If the inquiry to decision step 1125 is positive, then the "Yes" branch is followed to step 1130 where the data scaling restoration process ends.

Referring back to FIG. 11a, in the sampling restoration unit 319, the sampling is restored to the original sampling rate by adding samples between the transmitted samples. Interpolating between transmitted samples is understood by those skilled in the art. The frequency of the signal is up-converted to the original frequency in the frequency up converter 321, by mixing it with a local oscillator signal as shown above. Next the signal is filtered by bandpass filter 323. The signal is then converted to analog form in D/A converter 324. Thus, at the output of D/A converter 324 is the data from the Low port of the RF diplexer 507 of the subscriber optical interface 140, which was supplied to the input of the sample and hold circuit 521 and 523 of FIG. 10a.

Figure 12:
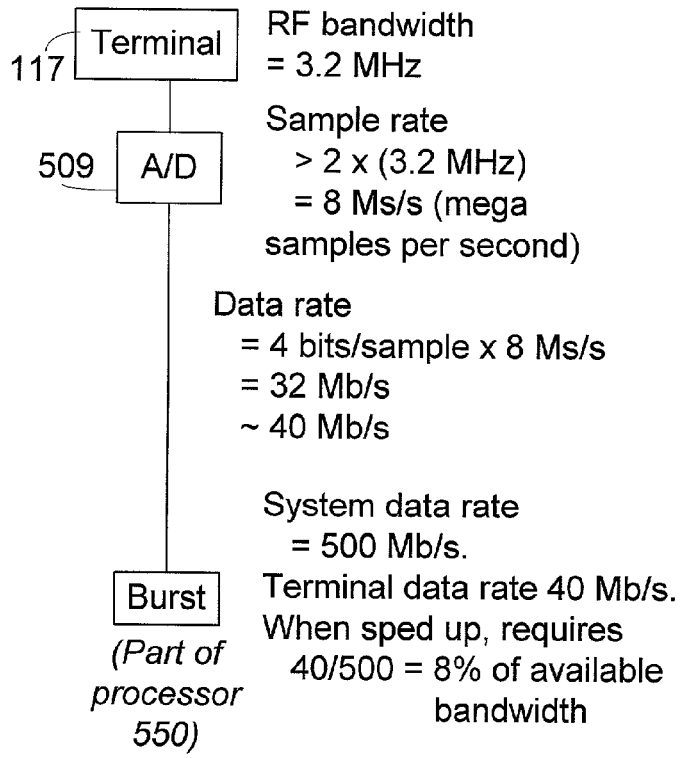
FIG. 12 illustrates an exemplary computation of a burst process for an exemplary embodiment of the present invention.
Figure 13:
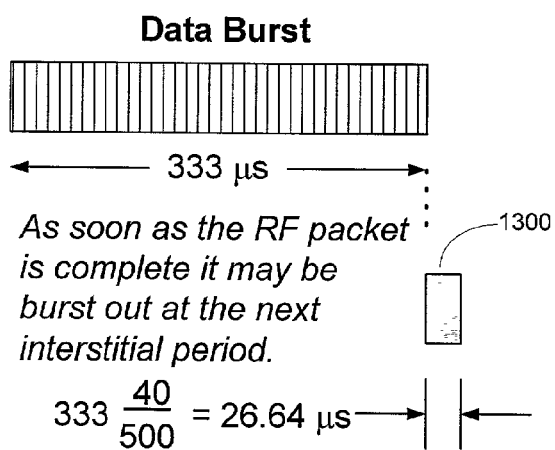
FIG. 13 illustrating an exemplary length of a data burst according to one exemplary embodiment of the present invention.

Referring now to FIGS. 12 and 13, these figures illustrate the computation of the burst process for upstream RF packets of an exemplary embodiment. In this exemplary embodiment, each video service terminal 117 is bursting data in packets that are 333 microseconds long. The occupied bandwidth is an exemplary 3.2 MHz, based on the worst-case DOCSIS return bandwidth. However, other bandwidths may be used in the calculation without departing from the spirit and scope of the present invention.

It is recommend that sampling occurs at twice this rate, or 6.4 Ms/s (mega, or million, samples per second). Sampling at a greater amount, such as at 8 Ms/s, may provide some safety margin and to make frequency selection somewhat easier. If sampling occurs at four bits per sample (16 levels—adequate for QPSK and possibly for 16 QAM modulation with careful level control), this yields a data rate of 32 Mb/s as shown. Some overhead may be needed, so the data rate can be rounded up to 40 Mb/s as the required data rate.

A typical burst length is 333 microseconds from the DVS 167 specification referenced above. In an exemplary embodiment, the data transmission on an optical waveguide is 500 Mb/s, so if a 40 Mb/s signal transmission speed is increased to a transmission speed of 500 Mb/s, it will require $$\frac{40}{500} = 8\%$$

of the available bandwidth. Therefore, a 333 microseconds burst will require a transmission time of $$333 \frac{40}{500} = 26.64 \ \mu s.$$

Because of the detailed requirements of the data transmission method used, this RF packet usually must be returned to the data service hub 110 and converted back to analog RF with a delay not to exceed just over 2 milliseconds (ms), and with very low jitter. However, other magnitudes of delay, smaller or larger, are not beyond the scope of the present invention.

If the bursts were simply packetized and sent back to the data service hub 110, there would be many milliseconds of jitter introduced by the packetized Ethernet transmission system. Thus, the invention teaches a method of getting the bursts of data back to the data service hub 110 outside of the normal method of handling packets, but without unduly burdening the cost of the equipment. The shaded box 1300 in FIG. 13 represents an interstitial burst comprising the RF packet data.

Figure 14:
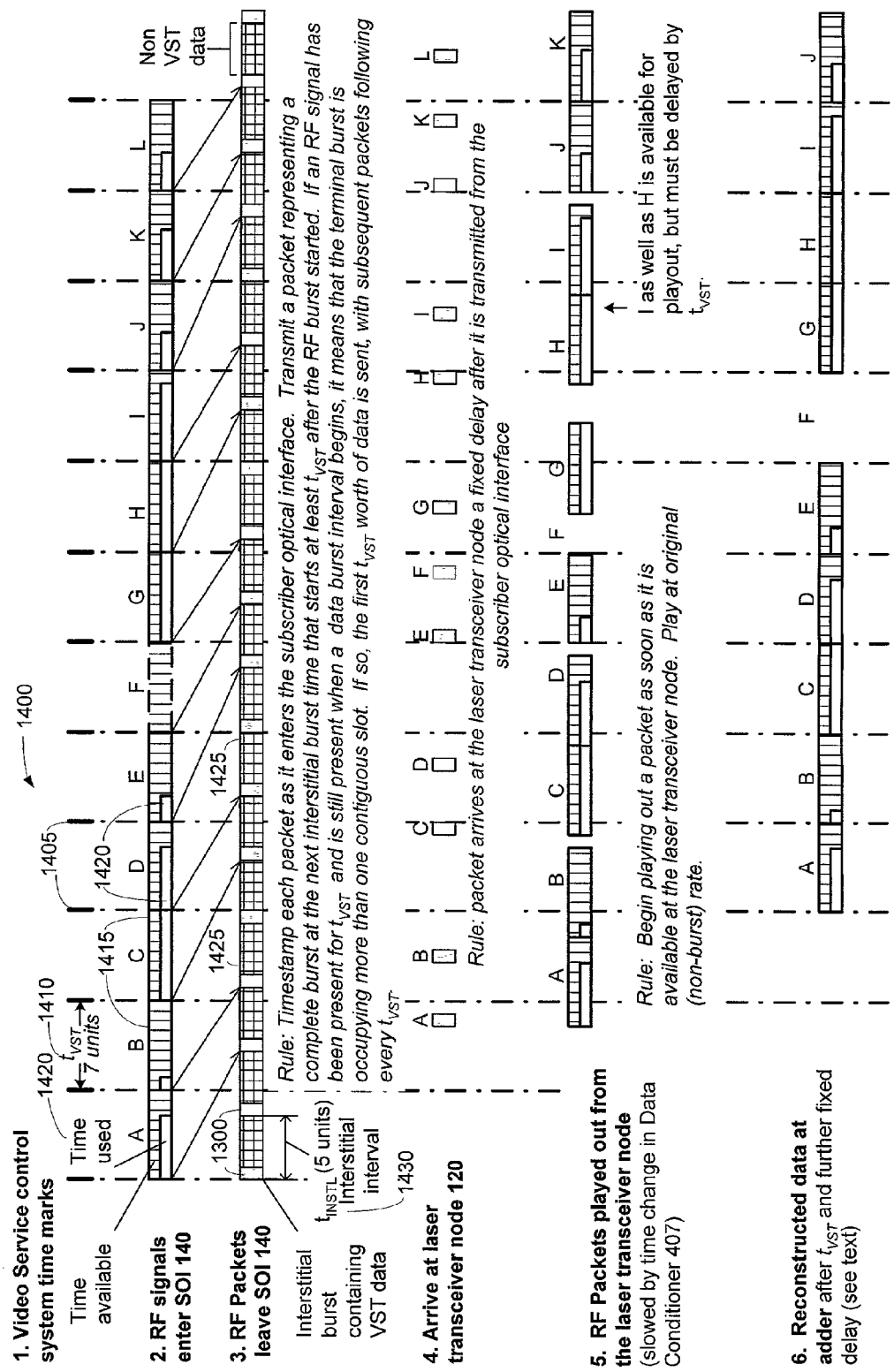
FIG. 14 is a diagram illustrating the timing of some exemplary RF return transmissions and some exemplary rules for handling RF packets.

Referring now to FIG. 14, this figure is a diagram that illustrates a timing scheme 1400 of the return RF analog signals and the rules for handling the RF packets produced from the RF analog signals. Row 1 of FIG. 14 illustrates the video service controller system time marks 1405 generated by the video services controller 115. These marks 1405 are spaced by the width 1410 of a video service terminal time slot, $t_{VST}$. The time marks 1405 indicate time as perceived at the data service hub 110. Time may be perceived as occurring later at all subscriber optical interfaces 140, due to propagation delay. The video services controller 115 will cause the transmission time of each video service terminal 117, located at each subscriber optical interface 140, to be advanced as much as is necessary to make the response arrive at the video service controller 115 at the correct time. The time marks 1405 of row 1 indicate the boundaries at which the video service terminal upstream transmissions are expected to be received by the video service controller 115.

In one exemplary embodiment, the time scale is such that there are seven units of time in a width of $t_{VST}$ 1410. Thus, a time offset of one unit will cause the packet time to be displaced by one-seventh of the distance between two time marks in row 1 or $$\frac{333}{7} = 47.57 \ \mu s.$$

Row 2 of FIG. 14 illustrates the transmission of RF packets at the subscriber optical interface 140. The data reducer 511 applies a data compression technique to the digitized RF packets in order to conserve return bandwidth. These RF packets are digitized by the A/D converter 509 of FIG. 8. The larger rectangles 1415 represent the time available for a video service terminal 117 to transmit. The smaller, clear, rectangles 1420 within the larger rectangles represent the time the video service terminal 117 actually transmits the RF packets. The transmission time may be shorter or longer than a video service terminal time slot width or $t_{VST}$ 1410. The letters above row 2 refer to the each of a plurality of subscriber optical interfaces 140 which can be treated as a group by the video service controller 115. These letters will be used in an example below.

Examining row 2 of FIG. 14, one recognizes that a video service terminal 117 associated with subscriber optical interface F does not transmit any RF packets. This is the rule rather than the exception: most of the time, it is assumed that each video service terminal 117 will not send data in a particular time slot. The problem with this rule is that the RF return system of the present invention does not know when a video service terminal 117 will want a particular time slot to transmit its RF packets. As noted above, the RF return system of the present invention and the legacy video services system operate independently of each other. That is, each terminal time slot or $t_{VST}$ 1410 is assigned and managed by the video service system controller 115 independently of the RF return system of the present invention which is responsible for carrying the return RF packets back to the data service hub 110.

The video service controller 115 does not permanently assign any time slot 1410. Each time a video service terminal 117 needs to transmit RF packets, it must compete for a time slot 1410, and when it is assigned one, it transmits its RF packets and then releases the time slot 1410. Thus, the example illustrated in FIG. 14 applies only to one instance of time. In another instances, other video service terminals 117 will be transmitting in the time slots shown.

Row 3 of FIG. 14 illustrates the interstitials 1300 that comprise the RF packets as they are transmitted out in interstitial bursts between non-video service terminal or regular data packets 1425. Row 3 is combined data as perceived by the optical tap routing device 435 or an adder 313 of an optical tap routing device 120. The non-video service terminal or regular data packets 1425 are generated by processor 550, in response to equipment serviced by the processor 550 such as computers, telephones, and other like data producing equipment as illustrated in FIG. 8. Regular data packets 1425 other than video service terminal data ("non-video service terminal data") is transmitted during most of the time, indicated by the hatched area in row 3.

RF packets within the interstitials 1300 are transmitted during interstitial times between the other data packets 1425. The timing of transmission for the interstitials 1300 is determined by the present invention rather than by the legacy video service controller 115. The interstitials 1300 of Row 3 also represent the instance of time each switch 513 of respective subscriber optical interfaces 140 as illustrated in FIG. 8 is connecting a respective data conditioner 407 to respective digital optical transmitter 530. The length of time between transmission of interstitials 1300 is referred to as an interstitial interval or $t_{INSTL}$ 1430. In order to correctly transmit RF packets to the video service controller 115, it is necessary for each interstitial interval, $t_{INSTL}$ 1430 to be less than a terminal time slot, $t_{VST}$ 1410. If an interstitial interval, $t_{INSTL}$ 1430 is substantially equal to or greater than a terminal time slot, $t_{VST}$ 1410, then it is possible that there will be two different video service terminals 117 trying to transmit during adjacent terminal time slots or $t_{VST}$ 1410 and in the process of relaying the RF packets back to the video service controller 115, there can be a data collision.

A rule that can be applied at the subscriber optical interface 140 is that the interstitials 1300 are burst or transmitted at regular intervals having a magnitude of $t_{INSTL}$ 1430. This means that all subscriber optical interfaces 140 that are normally timed together by a common port on the laser transceiver node 120 have the same interstitial burst time. This means, as mentioned above, that each switch 513 of a group of respective subscriber optical interfaces 140 connects a respective data conditioner 407 to a respective digital optical transmitter 530 at the same time. Though usually, it is assumed that nothing will be transmitted from any one subscriber optical interface 140 when the switches 513 connect to each data conditioner 407. In other words, most of the time, video service terminals 117 do not transmit any data.

When a video service terminal 117 does have something to transmit, it will send the analog RF signal to the subscriber optical interface, where the analog RF signal is digitized in A/D converter 509. The digitized RF packet may last up to the maximum time interval $t_{VST}$ 1410, but may last a shorter time if less information is to be transmitted. The actual time the packet lasts is the "actual time used" 1420 as illustrated in row 2 of FIG. 14. A video service terminal 117 may transmit for longer than $t_{VST}$ 1410, in which case two or more adjacent time terminal slots 1410 are used by the same video service terminal 117. In order for a video service terminal 117 to transmit during two consecutive video service terminal time slots 1410, it must request permission from the video service controller 115.

When the A/D converter 509 first detects the arrival of RF analog signals, it can time stamp the data based on time stamp signals received from the laser transceiver node 120. The time stamp is generated in laser transceiver node 120 and transmitted to the subscriber optical interface 120, where it is added to the digitized RF signal by way of controller 519 and data conditioner 407 (see FIG. 10a), which adds the time stamp to the data stream. This time stamp becomes the basis of recovering accurate timing at the data service hub 110. RF packets will be transmitted in the first interstitial burst time after a delay of $t_{VST}$ 1410 from the start of the incoming data. The arrows connecting rows 2 and 3 of FIG. 14 demonstrate when each interstitial 1300 comprising the RF packets could be transmitted.

The interstitials 1300 are sent to the laser transceiver node 120, as shown in row 4 in FIG. 14. The RF packets in a respective interstitial 1300 are routed via the optical tap routing device 435 to the data conditioner 407 in FIG. 5. As noted previously, the data conditioner 407 may comprise a FIFO which is a special purpose circuit known to those skilled in the art. The data conditioner 407 in the laser transceiver node 120 takes in the interstitial 1300 at its burst rate, and then puts out the RF data packets ("plays the RF data packets out") at the slower clock frequency that corresponds to the rate in which the packets pass through the A/D converter 509 and data reducer 511 (that is, the same rate as in row 2 of FIG. 14). The data conditioner 407 of the laser transceiver node 120 can be used to slow down the interstitial 1300 from the burst rate at which it was sent (500 Mb/s in one exemplary embodiment) to the rate at which the data was accumulated (40 Mb/s in one exemplary embodiment).

The data conditioner 407 of the laser transceiver node can begin playing out the RF packets, as illustrated in Row 5 of FIG. 14, as soon as the data conditioner 407 begins receiving the data, because it is assured of receiving data in at a fast enough rate that it will not run out of data before it completes the sending of the RF packets. The reason for slowing the data rate down at the laser transceiver node 120 is to reduce the power required of the optical link between the laser transceiver node 120 and the data service hub 110. Row 6 of FIG. 14 illustrates grouping reconstructed RF packets at the adder 313 of FIG. 7.

After passing through the adder 313, the RF packets can be transmitted at 1310 nm, using the same optical fiber 160 that is used to deliver the downstream video and the downstream video service control signals. The RF packets will arrive at the data service hub 110 as illustrated in FIG. 3, on low speed optical receiver 370. From here the RF packets are supplied to the delay generator 305. The delay generator may also comprise a FIFO. Delay generator 305 may accept each RF packet in at the rate that is needed in the data-to-RF converter 307, but the signal is usually further delayed in the delay generator 305 in order to be timed correctly. The delay is calculated from the time stamp added at the subscriber optical interface 140, described above.

At a minimum, in one exemplary embodiment, the delay must be substantially equal to an interstitial interval or $t_{INSTL}$ 1430 to prevent one RF packet from getting ahead when there is RF packet just prior to it. More delay usually must be added according to how much propagation delay is experienced across the optical network. In one exemplary embodiment, data being sent from laser transceiver node 120 to data service hub 110 is sped up slightly to prevent overlap of adjacent data packets coming form two different laser transceiver nodes 120.

Figure 15:
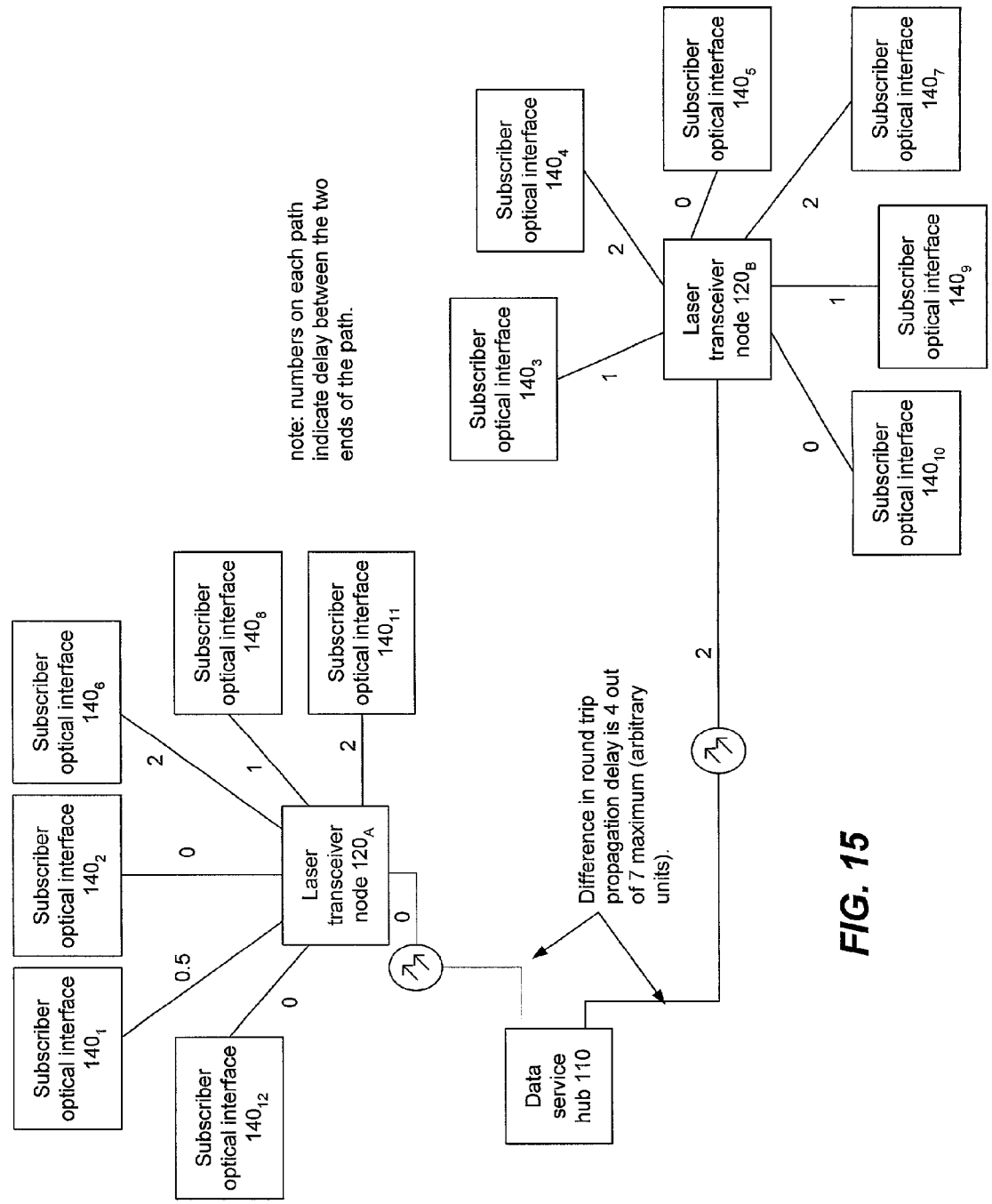
FIG. 15 illustrates exemplary timing delays that can occur between respective subscriber optical interfaces and laser transceiver nodes according to the present invention.

Referring now to FIG. 15, this figure illustrates exemplary timing delays between respective subscriber optical interfaces 140. As noted above, the legacy video service system will respond in the same manner as if the RF return system of the present invention were not present. In the example illustrated in FIG. 16 (discussed below), it is assumed that the video service terminals 117 (not shown) have not received their proper timing offset to account for their distance from the data service hub 110. That is, each video service terminal 117 (not shown) connected to a respective subscriber optical interface 140 is not marshaled. Normally as each video service terminal 117 is added to the system, it is automatically discovered by the video service controller 115, and marshaled at that time. Thus, in a real world example, there would not be a number of video service terminals 117 that were out of time simultaneously, but FIG. 15 demonstrates this unlikely scenario for the sake of illustration.

Normally, as explained in conventional standards DVS 167 and DVS 178 that govern the legacy video services system, a wide or longer time slot is provided periodically to allow the discovery and marshaling of a new video service terminal 117, without risking the terminal 117 transmitting simultaneously with a previously marshaled video service terminal 117. In FIG. 15, two laser transceiver nodes 120A and 120B service a number of attached subscriber optical interfaces 140. The two laser transceiver nodes 120A and 120B are positioned at different distances from the data service hub 110, resulting in differing propagation delays between the data service hub 110 and the two laser transceiver nodes 120A and 120B. There are also differing propagation delays between the two laser transceiver nodes 120A and 120B and their appended subscriber optical interfaces 140, due to different lengths of optical waveguides connecting each subscriber optical interface 140 to its respective laser transceiver node 120.

In the example in FIG. 15, arbitrary time units have been used that are related to the graphical construct used for illustration. This does not reduce the generality of the technique to accommodate different real propagation delays.

All of the subscriber optical interfaces 140 illustrated in FIG. 15 are connected back to one video service control receiver 309 as illustrated in FIG. 4. Thus, the subscriber optical interfaces 140 are timed such that their signals will be received at the video service control receiver 309 (located in data service hub 110) at a scheduled time, to allow the video service control receiver 309 to marshal them just as if they were connected via a conventional HFC network rather than a optical network of the present invention.

Figure 16:
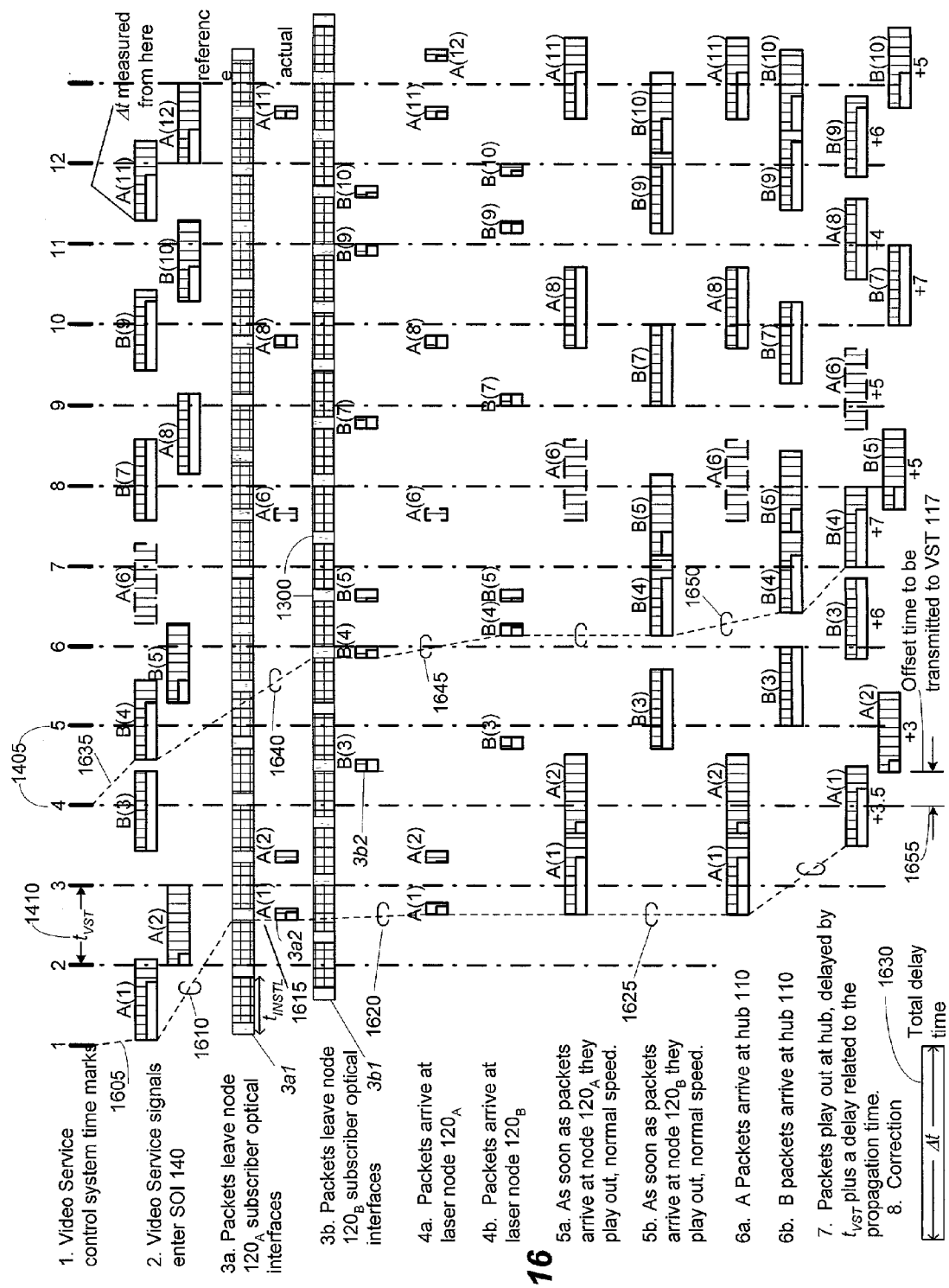
FIG. 16 is a diagram illustrating an exemplary embodiment where each of the legacy video service terminals are unmarshaled, meaning that the video service terminals do not know how much in advance of the start of a video service time slot they are to transmit to make up for any propagation delays.
Figure 17:
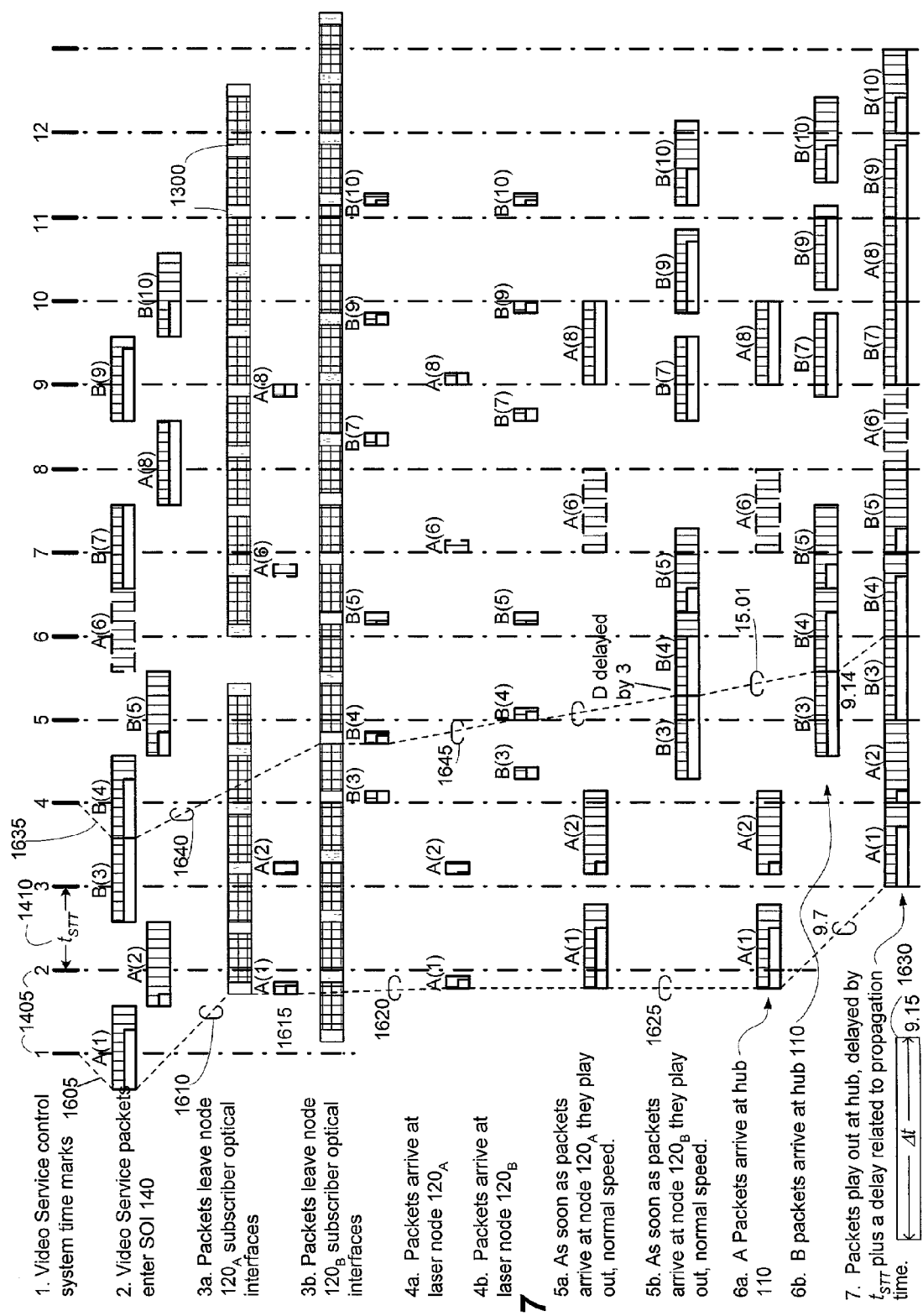
FIG. 17 is a diagram illustrating an exemplary embodiment where each legacy video service terminal is marshaled, meaning that each legacy video service terminal does know how much in advance of the start of an upstream transmission time slot they are to transmit to make up for any propagation delays.

FIG. 15 corresponds with two timing diagrams that are illustrated in FIGS. 16 and 17. FIG. 16 assumes that the video service terminals 117 have not been timed properly with the data service hub 110. The timing diagram of FIG. 16 will usually occur when the video service terminals 117 are first installed. When video service terminals 117 respond to the video service control receiver 309, the receiver 309 will measure response time error and will instruct the video service terminal 117 to advance its timing sufficiently to make the response be received at the video service control receiver 309 at the proper time. FIG. 17 illustrates the situation in which all the video service terminals 117 have been recognized or have been registered with the receiver 309.

Referring back to FIG. 15, the numbers adjacent to each optical waveguide path indicate exemplary one-way time delays between the two ends of the path. These exemplary time delays are well understood by those skilled in the art, and relates to the propagation delay through optical waveguides. The first laser transceiver node 120A is located closer to the data service hub 110 relative to the second laser transceiver node 120B, so there is no significant propagation delay between the laser transceiver node 120A and data service hub 110. The second laser transceiver node 120B is located further from the data service hub 110, so there are an exemplary two units of delay in the one-way optical waveguide path. Similarly, there is an exemplary 0.5 unit of delay between the first laser transceiver node 120A and subscriber optical interface 140$_1$, and two units of delay between the second laser transceiver node 120B and subscriber optical interface 140$_4$. Other delays are as shown in the FIG. 15.

Referring now to FIG. 16, this figure illustrates the situation that exists when none of the video service terminals 117 are marshaled. That is, each video service terminal 117 does not know how much in advance of the start of a terminal time slot 1410 it is to transmit RF packets to make up for any propagation delay. Because the video service terminals 117 in this example do not have this advance information, they will typically transmit as soon as their assigned time slot occurs. This will often result in the RF packets arriving back at the video service controller 115 too late.

The video service controller 115 will typically measure the amount of lateness or delay and send a signal to the video service terminal 117 informing it how much in advance of a data slot it should transmit RF packets. In actual implementation, usually only one video service terminal 117 at a time will be marshaled. As a result of the illustration of a plurality of unmarshaled video service terminals 117 depicted in FIG. 16, there are data collisions at the data service hub, which will usually not exist in any actual implementation.

FIG. 16 illustrates how the video service terminal RF data packets will usually travel to the data service hub 110, using the optical architecture and its associated timing delays depicted in FIG. 15. Two packets in FIG. 16 will be described in detail below. The first packet will be packet A(1) that travels from subscriber optical interface 140$_1$, through laser transceiver node 120A, to data service hub 110 and finally to the video service control receiver 309. For packet A(1), the "(1)" indicates that it originated in the video service terminal 117 (not shown) connected to subscriber optical interface 140$_1$. The "A" indicates that the subscriber optical interface 140$_1$ is connected to laser transceiver node 120A. The second packet that will be described is packet B(4) that passes through laser transceiver node 120B.

The video service controller 115 sends out the timing pulses 1405 as shown in row 1 of FIG. 16. Row 2 demonstrates the time at which A/D converter 509 and associated circuitry sends an RF packet to processor 550. The timing 1420 of the RF packets are shown in two sub rows of row 2 because the times will overlap In the example described in FIG. 15, laser transceiver node 120A is located so close to the data service hub 110 that there is no significant propagation delay between the two devices. Subscriber optical interface 140$_1$ is located 0.5 time units of propagation delay from laser transceiver node 120A. Recall that the video service control time marks 1405 in row 1 (of FIG. 16) are times as viewed from the data service hub 110. The video service terminal 117 (not shown) at subscriber optical interface 140$_1$ transmits 0.5 time unit later than the first timing mark 1405(1) as a result of the 0.5 delay, as shown by the slanted dashed line 1605 between the first timing mark 1405(1) in row 1 and the video service terminal packet start time in row 2.

Row 3a contains two sub rows 3a1 and 3a2. Subrow 3a1 depicts the timing of interstitials 1300 of RF packet data (separated by $t_{INSTL}$ 1430) and non-video service terminal packet data 1425 bound for laser transceiver node 120A. Subrow 3a2 depicts the actual interstitial burst from each subscriber optical interface 140 without illustrating any of the regular, non-video service terminal packet data. The RF packets of row 2 are transmitted according to the rule in mentioned in FIG. 14: during the first interstitial 1300 occurring at least the video service terminal transmission time increment after the start of the video service terminal transmission. The delay from when the beginning of the RF packet A(1) arrives at the subscriber optical interface 140$_1$ and when it leaves, is denoted by slanted dashed line 1610.

A delay does not exist between the time when the interstitial interval begins and the RF packet A(1) leaves the subscriber optical interface 140$_1$, as shown by vertical line 1615. Since there is 0.5 unit of propagation delay from subscriber optical interface 140$_1$ and laser transceiver node 120A (as illustrated in FIG. 15), the time the RF packet A(1) arrives at the laser transceiver node 120A is delayed by 0.5 unit, as shown by dashed line 1620, which is slightly slanted.

In row 5a, as soon as the RF packet A(1) arrives at the laser transceiver node 120A, it is slowed by data conditioner 407, and starts being played out at the same data rate as in row 2. When RF packet A(2) arrives, its playout must be delayed because RF packet A(1) has not finished playout at that time. Usually this does not cause a problem, since RF packet A(2) simply "gets in line" in the data conditioner 407 behind RF packet A(1) and begins playing out RF packet A(2) when the playing out of RF packet A(1) is completed.

RF packet A(1) arrives at the data service hub 110 (row 6a) without delay, by virtue of little separation between data service hub 110 and laser transceiver node 120A. This is shown with vertical line 1625. At the data service hub, the delay generator 305 reads the timestamp that was attached to the RF packet at the subscriber optical interface 140, and delays the data for the total time programmed, which depends on the total propagation delay 1630 from the furthest subscriber optical interface to the data service hub. The total propagation delay parameter delta t 1630 is supplied at system set-up. Delta t 1630 is illustrated at the bottom of FIG. 16. The point from which delta t 1630 is measured is shown at packet A(11) in row 2 of FIG. 16, as an example.

The tracking of packet B(4) will now be described. Packet B(4) is tracked as it moves from subscriber optical interface 140$_4$ to the data service hub 110. Propagation delay to subscriber optical interface 140$_4$ is a total of four units (see FIG. 15). Two units of one-way delay exist between the data service hub 110 and the laser transceiver node 120B. Another two units of delay exist between the laser transceiver node 120B and subscriber optical interface 140$_4$. Because of this delay, the time that the RF packet B(4) of FIG. 16 is transmitted is delayed by four units as shown by diagonal line 1635. Row 3b1 shows RF packet timing for the subscriber optical interfaces attached to laser transceiver node 120B. RF packet B(4) usually must wait for the interstitial burst time shown, so it is transmitted with a delay represented by slanted line 1640.

There is another delay of two units from subscriber optical interface 140$_4$ to laser transceiver node 120B, represented by slanted dashed line 1645. At row 4b in FIG. 16, the burst RF packet B(4) arrives at the laser transceiver node 120$_B$, where it immediately begins getting played out at the speed of row 2. This RF packet B(4) is transmitted back to the data service hub 110, but encounters a propagation delay of two units along the way, so it arrives at the data service hub 110 delayed by 2, as shown by slanted dashed line 1650. Finally, RF packet B(4) is delayed by a total of delta t 1630 as measured from the beginning of the packet start in row 2, which is the time that was time-stamped at the subscriber optical interface.

Row 8 of FIG. 16 indicates the amounts by which the video service controller 115 must tell each video service terminal 117 to advance its transmission in order to get its RF packet data back to the data service hub 110 at the correct time the nearest video controller system time mark of row 1. This correction time is unique for every video service terminal, and may be measured from the time mark at which the data are expected to the time the data arrives, and is shown for packet A(2) below row 8 packet A(2) at 1655. This time is usually transmitted to the video service terminal 117, which then advances its transmission time by that amount.

A number of collisions are shown in row 7 of FIG. 16 represented by RF packets that overlap each other in time. The RF packets are separated vertically simply to allow the reader to see them individually. The collisions can be resolved by marshaling the video service terminals 117. Marshaling can be defined as the transmission of the timing corrections of row 8 to the video service terminals 117.

FIG. 17 illustrates how the video service terminal RF data packets will usually travel to the data service hub 110, using the optical architecture and its associated timing delays depicted in FIG. 15. However, unlike FIG. 16, FIG. 17 illustrates video service terminals 117 that have been marshaled by the video service controller 115 to compensate for the timing delays depicted in FIG. 15. Only the differences between FIGS. 16 and 17 will be described below.

Compared to FIG. 16, the subscriber optical interface timing in rows 3a1 and 3b1 of FIG. 17 have been changed. Since the legacy video service system and the present invention have completely independent timing domains, the timing between the two different systems will typically slip. The timing of FIG. 17 may be followed as in FIG. 16, with the same lines marked to show timing relationships. The difference in FIG. 17 is that when the RF packets reach the data service hub 110 they are in the proper timing relationship as illustrated in row 7 of FIG. 17.

The minimum delay time delta t 1630 that the system should introduce can be calculated by the following equation:

$$\Delta t = t_{VST} + t_{INSTL} + t_{prop} + t_{residual}, \text{ where}$$

Δt=delay time from when an interstitial burst is first seen at subscriber optical interface 140 to when it is presented to the video service controller 115 at the data service hub 110.

$t_{VST}$=minimum time between which two different video service terminals 117 can transmit upstream RF packet data (see FIG. 14).

$t_{INSTL}$=interstitial time in the RF return system (see FIG. 14).

$t_{prop}$=difference in one-way propagation time in longest and shortest total length of an optical waveguide to be used.

$t_{residual}$=any residual delays in A/D 509, D/A 524, data conditioners 407, and other circuitry in the RF return path.

Failure to introduce delta t 1630 will usually require some packets to be played out at the data service hub 110 before they are available. In the example above, $t_{VST}$=7, $t_{INSTL}$=5, $t_{PROP}$=4, and $t_{RESIDUAL}$=0. In this case delta t 1630 will typically equal sixteen at a minimum. The value of delta t 1630 used in the graphical solutions of FIGS. 16 and 17 was seventeen, one more time unit than is necessary. In FIG. 17, rows 6(B) and 7, RF packet B(7) usually must play out only one unit after the leading portion of it becomes available. This one unit is the additional delta t 1630 over and above the minimum. Had delta t 1630 been less than sixteen, then the RF packet B(7) would be demanded before it was available.

Delta t 1630 may be understood as follows. The delay of $t_{VST}$ comes from the requirement to delay the data transmission from the subscriber optical interface 140 until after a complete RF packet of data is available. This is necessary to ensure that a complete RF packet is available when the system is ready to transmit it, and to ensure that two packets from different video service terminals 117 don't collide. The $t_{INSTL}$ delay 1430 is added because once the RF packet (row 2) is ready, it may have to wait this long before an interstitial interval comes along. A delay of $t_{PROP}$ is needed to allow the signal to propagate from the subscriber optical interface 140 to the data service hub 110. The $t_{RESIDUAL}$ time accounts for any unavoidable processing delay in digitizing and data reducing the RF signal or changing it back to the original analog RF form, plus residual delay in the two data conditioners 407 in the signal chain (in the subscriber optical interface 140 and laser transceiver node 120), plus any other small delays.

In addition, note that the video service controller 115 will usually be required to allow for an extra integer number of delay increments of $t_{VST}$ 1410 as a result of the introduction of the RF return system of the present invention. The number of $t_{VST}$ 1410 increments required can be calculated as follows:

$$INT\left(\frac{\Delta t}{t_{VST}}\right).$$

INT indicates that the integer portion of the argument is to be taken. In the example case above, delta t=17 and $t_{VST}$=7. Therefore the number of increments of $t_{VST}$ that the video service controller 115 must usually allow for is equal to two, consistent with the way FIGS. 16 and 17 are depicted.

The aforementioned exemplary embodiments are typically used in the majority of cases in which the service provider of an optical architecture wants to provide video services and data services. However, in some cases, some or all of the subscribers may only want to subscribe to video services. Where only video services are desired by subscribers, there are lower cost methods to provide support for a RF return channel that does not include all of the data circuitry required to support data services. In these cases, it is also possible that the service provider may want to support a return channel for modem data as well as video service terminal data. These additional requirements may be accommodated by the various alternative embodiments as discussed below.

Figure 18:
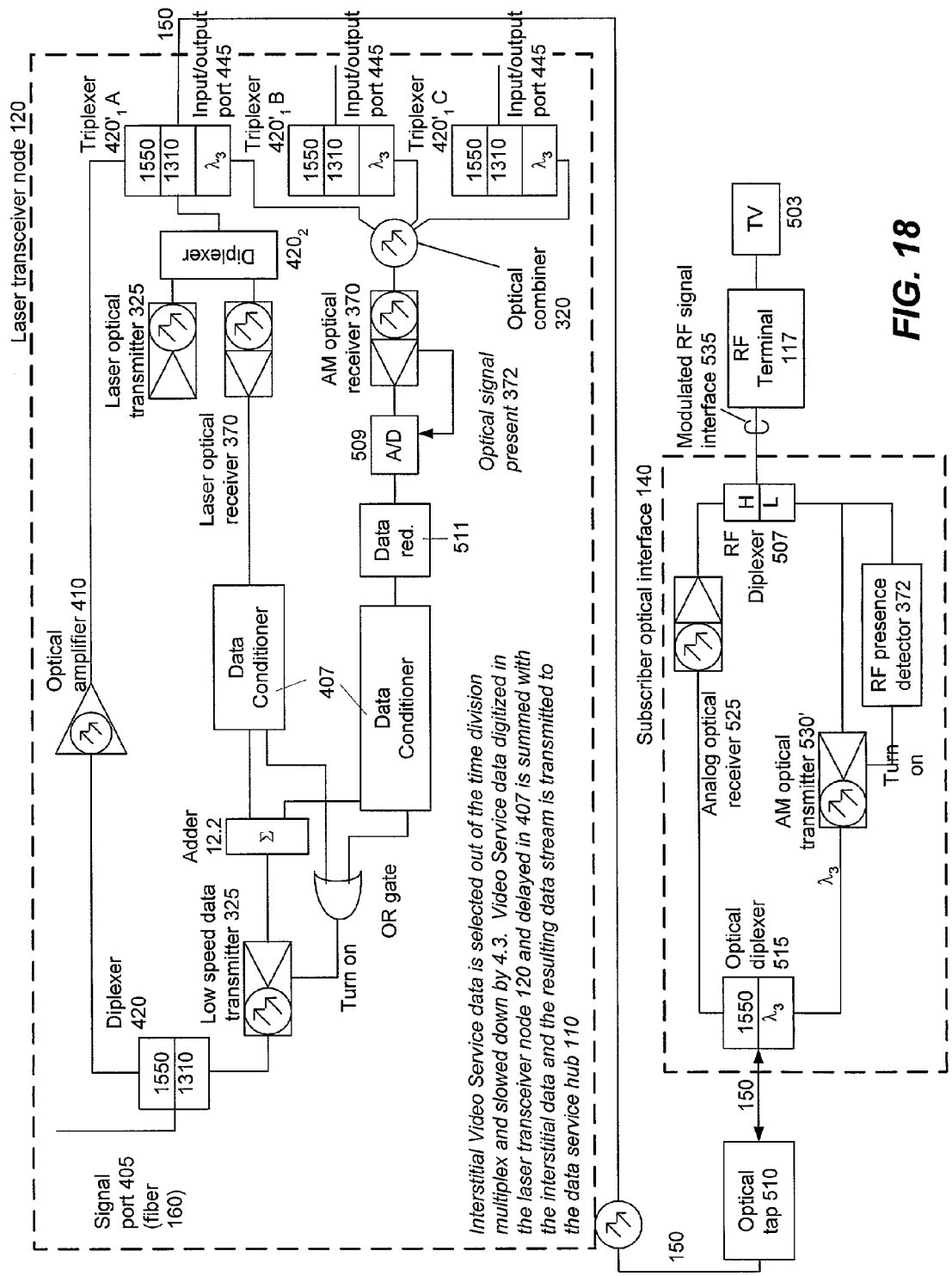
FIG. 18 illustrates an alternative and exemplary embodiment in which a subscriber is not subscribing to any data services while data services are being supplied to other subscribers.

Referring now to FIG. 18, this figure illustrates the situation where a subscriber is not using any data services, but data services are being supplied to other subscribers. The approach taken in this case is to modulate the return RF signal from the video service terminal 117 onto an inexpensive Amplitude Modulated (AM-analog) optical transmitter 530' used to transport only the video service terminal return signal. Because it transports only one signal at a time, and because that signal contains only simple forms of digital modulation, the quality of the AM optical transmitter 530' can be low. Also, much of the RF return processing circuitry can be placed in the laser transceiver node 120 to service multiple subscriber optical interfaces 140.

The wavelength emitted by AM optical transmitter 530' usually must not be in the 1310 nm region because other users may be using data transported at this wavelength as shown in the first sections of this disclosure. Suitable wavelengths for lambda $\lambda_3$ include 1490 nm ±10 nm, which is being used for some specialized applications, other wavelengths in the vicinity of 1550 nm not being used by the analog optical transmission path, and 1625 nm which is sometimes used for internal communications within optical networks. However, the present invention is not limited to these wavelength regions and can include regions higher or lower than described with out departing from the scope and spirit of the present invention. As VCSEL (vertical cavity surface emitting laser) devices come into common use, it is expected that they will make particularly advantageous transmitters for this application, although other technologies may be used.

It is important to turn off transmitter 530' when data is not being transmitted, because other subscriber optical interfaces may be transmitting when this one is not. RF presence detector line 372 detects the existence of RF data and turns on transmitter 530'.

The return RF optical signal is diplexed onto fiber 150 and transported to the laser transceiver node 120 as shown previously. As discussed above, optical waveguide 150 serves a plurality of subscribers, all of whose signals will be combined before arriving at triplexer 420'$_1$. At laser transceiver node 120, the signal at wavelength $\lambda_3$ (lambda 3) is separated in triplexer 420'$_1$. This device works the same as the previously-introduced diplexer 420'$_1$, except that a third output has been added, at a wavelength of lambda $\lambda_3$. Such triplexers 420'$_1$ are known to those skilled in the art.

As shown in FIGS. 6 and 7 above, a plurality of input/output ports 445 exist at the laser transceiver node 120, and each may have need of the instant teaching. Thus, the lambda $\lambda_3$ outputs of all triplexers 420'$_1$ are combined in optical combiner 320.

From optical combiner 320, the optical signal is supplied to AM optical receiver 370', which converts the optical signal(s) from the subscriber optical interface(s) 140 back to electrical form. At this point, the signal is the same as that applied to the input of A/D converter 509 in FIG. 8, though there may be a plurality of signals if more than one subscriber is using this return method. RF return signals will usually not overlap in time, because the video service controller 115 manages the video service terminals 117 to prevent an overlap.

The function of A/D converter 509, data reducer 511, and data conditioner 407 is identical to that of the corresponding parts in FIG. 8 and other figures, with the exception that the RF signal does not need to be sped up into an interstitial burst as was required previously for transmission to the laser transceiver node 120. The purpose of the aforementioned interstitial burst where the data conditioner 407 in the subscriber optical interface 120 increased the transmission rate of the return RF packet was to transmit the RF packet to the laser transceiver node 120 without interfering with other regular data packets, by condensing its time and bursting it out between other regular non-video service data packets. Developing the interstitial burst is not necessary in FIG. 18 for the RF data being digitized in the laser transceiver node 120 because by the time the signal has reached the laser transceiver node 120, the RF data packets are separated from the other data packets anyway. No interstitial transmission is needed in this exemplary embodiment. However, data conditioner 407 for the RF data being emitted from subscribers who also produce regular data packets operates identically as in FIG. 6, meaning that the data conditioner 407 for these subscribers who have data services does slow down the RF packets at this stage.

The optical signal present line 372 is used to suppress A/D conversion when no signals are present. That is, it can preclude noise from causing spurious counts from the A/D converter 509. The data conditioner 407 operating on data coming through AM optical receiver 370' (unlike the data conditioner 407 above it) doesn't need to take in data at the interstitial burst rate and slow it down, but it does need to delay the data as shown between rows 2 and 5 of FIGS. 16 and 17. Finally adder 313 is used to combine the signals from the two data conditioners 407. The combined RF signal is transmitted upstream using transmitter 325. Since other signals can be combined with this one upstream signal, it may be more energy efficient to turn on the transmitter 325 only when there is something to transmit. This may be accomplished with the two data conditioners 407 being coupled to an OR gate 421 where the resulting signals are used to turn on transmitter 325.

Operation of the data service hub 110 (not shown) that is connected to this laser transceiver node 120 in FIG. 18 is identical to that illustrated in FIG. 3. The RF packets arriving back at the data service hub 110 (not shown) are identical with those described with respect to FIG. 3.

Figure 19:
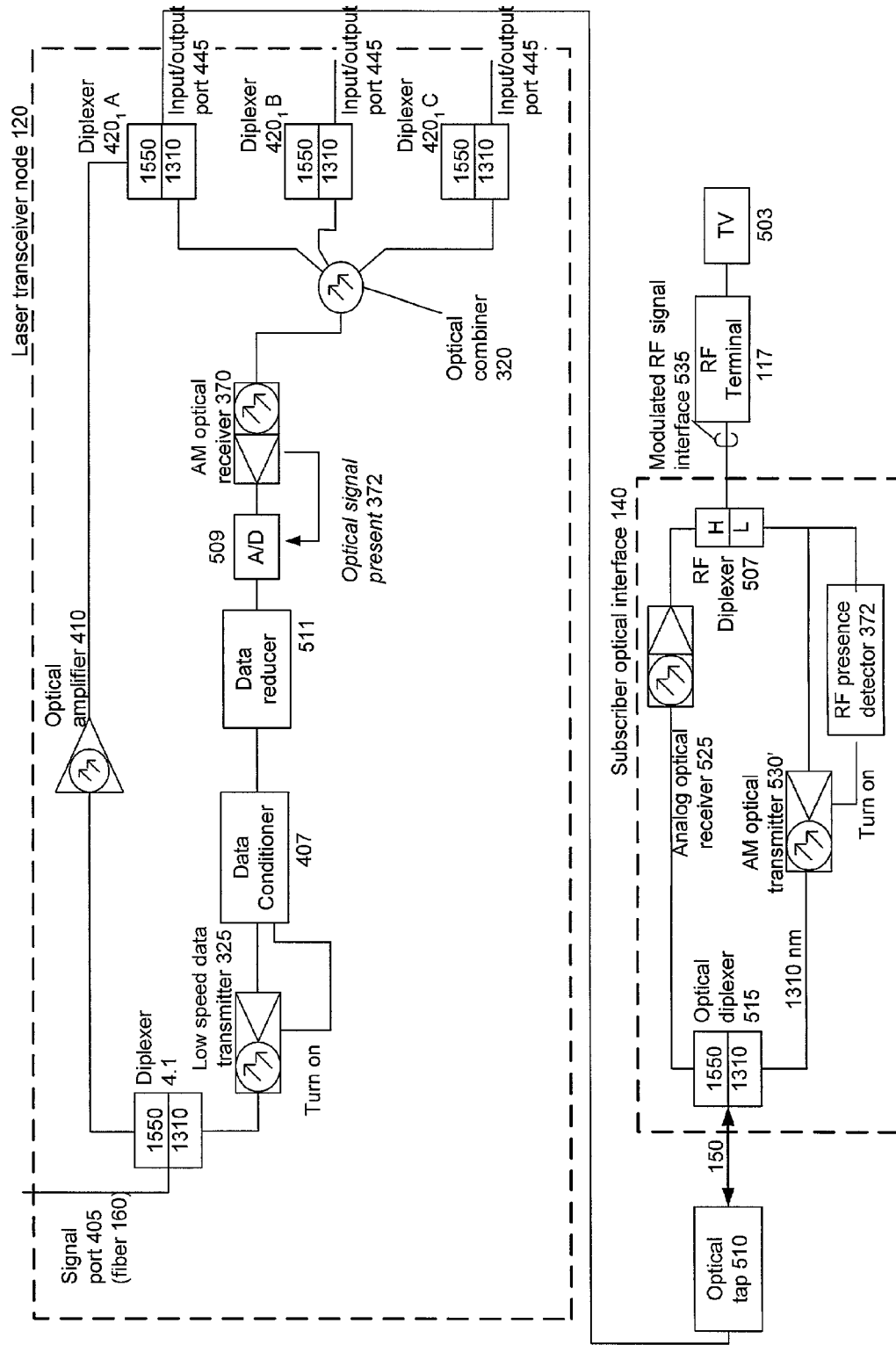
FIG. 19 illustrates another alternative and exemplary embodiment in which data services are not supplied to any subscribers.

Referring now to FIG. 19, this figure illustrates the situation where data services are not provided to any subscriber. Because of the similarities between FIGS. 18 and 19, only the differences between these two figures will be described.

As it is apparent from FIG. 19, the equipment at the laser transceiver node 120 associated with other upstream data delivery has been eliminated. Also, the wavelength of AM optical transmitter 530 has been changed back to 1310 nm. The operation could take place on the aforementioned lambda $\lambda_3$ wavelength, but using 1310 nm will likely result in cost savings. However, other wavelengths or wavelength regions could be used without departing from the scope and spirit of the present invention. Triplexer 420'$_1$ of FIG. 18 has now been replaced with a diplexer in FIG. 19.

The activation of the optical transmitters 530' and 325 is accomplished in a similar manner as described in FIG. 18. The RF packets arriving back at the data service hub 110 (not shown) is identical with that of the FIG. 3 system.

Figure 20:
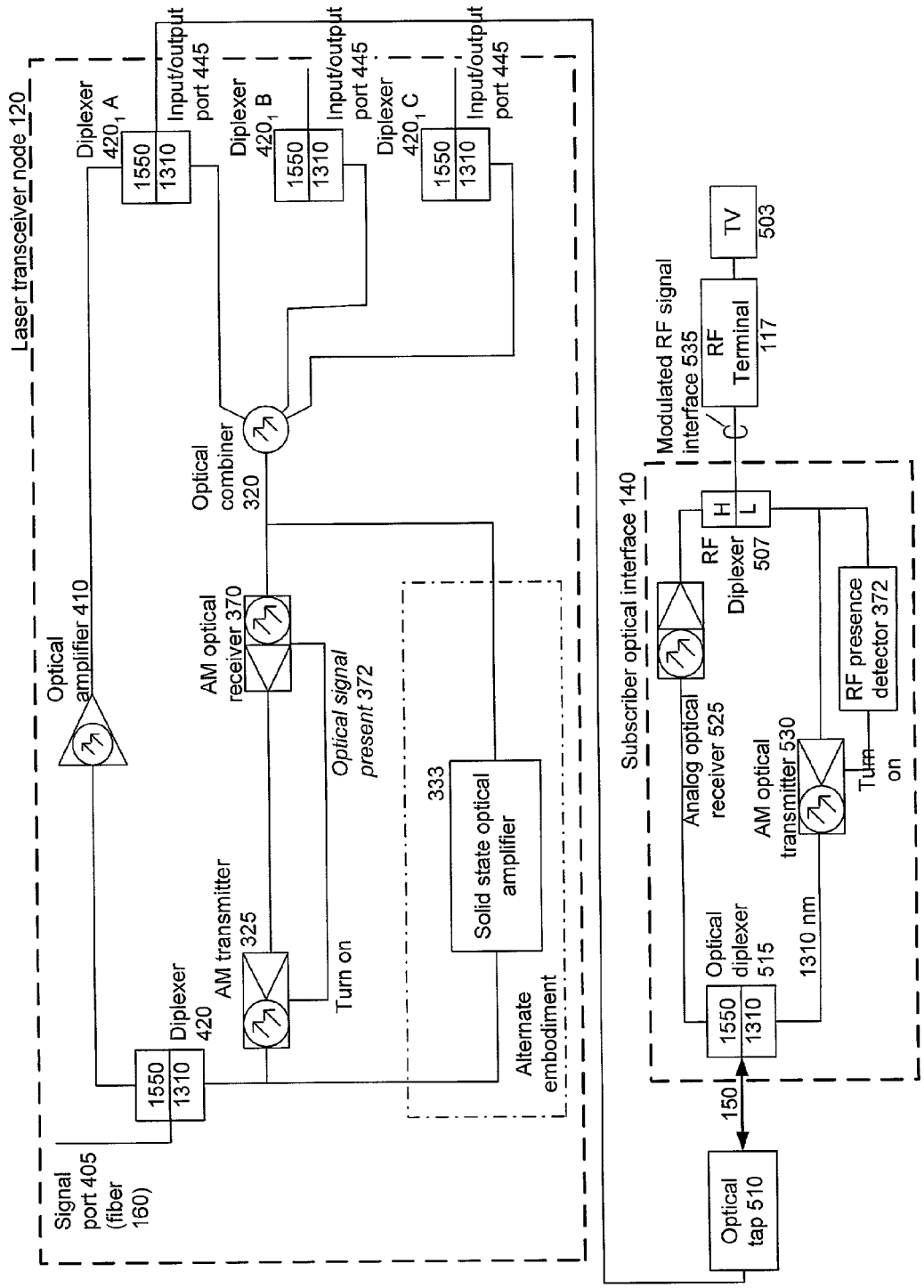
FIG. 20 is a diagram illustrating an alternative and exemplary embodiment in which all subscribers do not receive any data services and in which all RF return signals are propagated by analog laser modulation.

Referring now to FIG. 20, this figure illustrates the situation where data services are not provided to any subscriber and RF packets are not used. Rather, the signals stay in RF-modulated form and are not converted to digital packets. But because there are still similarities between FIGS. 19 and 20, only the differences between these two figures will be described.

FIG. 20 illustrates an exemplary embodiment that is well suited for short distances. In this exemplary embodiment, costs can be lowered if RF data is returned all the way to the data service hub 110 as RF signals modulated onto analog lasers. Since only one signal is usually present at a time by virtue of the way the legacy video service system works, the quality of the transmitters can be low.

The subscriber optical interface 140 of FIG. 20 is identical with FIG. 19, but the laser transceiver node 120 is different. In this case all return RF optical signals from all subscriber optical interfaces 140, coming from different input/output ports 445 are combined in an optical combiner 320. Since the RF optical signals are typically transmitted at a wavelength of 1310 nm, they cannot be economically amplified, so they are converted to electrical form in AM optical receiver 370, then reconverted to optical form in AM transmitter 325. The optical signal present line 372 is used to turn on AM transmitter 325, so that optical noise received when signals are not present, will not propagate upstream from the laser transceiver node 120.

As solid state amplifiers operative at 1310 nm become widely available and operate in the requisite temperature environment, a solid state amplifier 333 can replace AM optical receiver 370 and AM transmitter 325.

In FIGS. 18, 19, and 20, the single AM optical receiver 370 may be replaced my a plurality of AM optical receivers 370, each just after its respective diplexer 420$_1$. And optical combiner 320 can be replaced with an RF combiner. This would accommodate lower loss budgets because the optical signal would not suffer the loss of optical combiner 320. On the other hand, it would drastically increase the number of AM optical receivers 370 required.

As noted above, the exemplary embodiments described in FIGS. 1–9 can be used to address all the needs of subscribers in which the data service provider of a FTTH or similar system wants to provide for subscriber video service and data service. However, as mentioned in connection with FIGS. 18–20, in some cases subscribers will only want video service. Where only video service is wanted, there are lower cost ways to provide support for a return RF channel, rather than to include all the data circuitry required to support both data packets and RF packets. In these scenarios where only video services are desired, it is also possible that the data service provider will want to support a return channel for modem data as well as video service terminal data. These additional requirements may be accommodated by the various alternative embodiments illustrated in FIGS. 18, 19, and 20.

Figure 21:
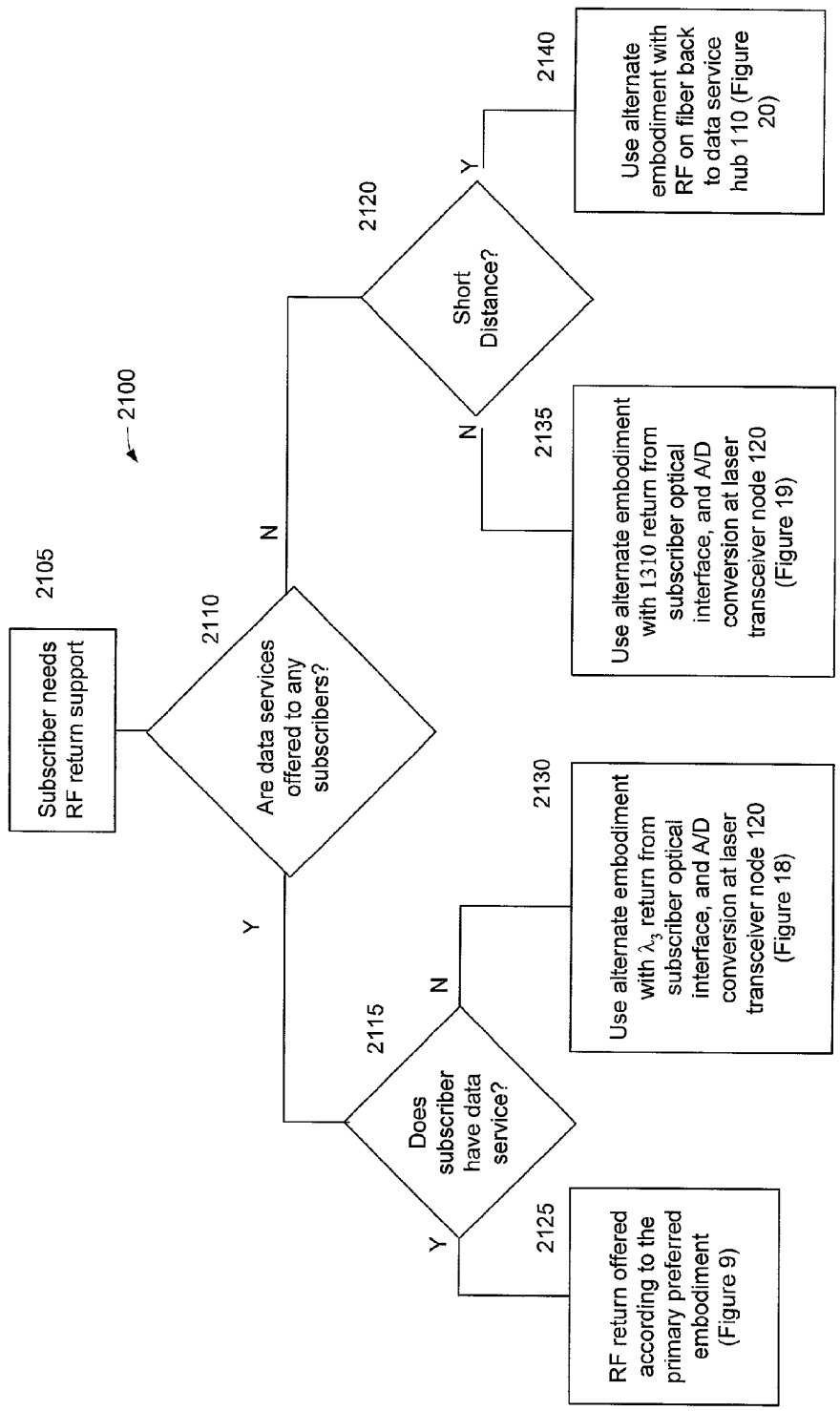
FIG. 21 is a logic flow diagram illustrating an exemplary method for deciding which return method to use based upon how subscribers are to be serviced.

FIG. 21 illustrates a method 2100 to determine which RF return method of the methods previously described to use in a particular situation. Certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

The method 2100 starts with step 2105 when a subscriber needs RF return support for either a video service terminal 117 and/or a cable modem (not shown). In decision step 2110, it is determined whether or not the FTTH system offers data services to any subscribers. This is important because if the system does offer data services to other subscribers, then even if the subject subscriber does not take data services, there are limitations on what can be done to the return RF data so as to not interfere with data being taken by other subscribers.

If the inquiry to decision step 2110 is positive, then the "Yes" branch is followed decision step 2115 in which it is determined whether a particular subscriber has data service in addition to needing RF return support. If the inquiry to decision step 2110 is negative, the "No" branch is followed to decision step 2120 in which it is determined if the RF return signals will be propagated over relatively short distances as perceived from an optical waveguide/power design perspective.

If the inquiry to decision step 2115 is positive, then the "Yes" branch can be followed to step 2125 in which the exemplary embodiment illustrated and summarized in FIG. 9 should be selected to address the needs of the subscribers. If the inquiry to decision step 2115 is negative, then the "No" branch can be followed to step 2130 in which the exemplary embodiment illustrated in FIG. 18 should be selected to address the needs of the subscribers If the inquiry to decision step 2120 is negative, then the "No" branch can be followed to step 2135 in which the exemplary embodiment illustrated in FIG. 19 should be selected to address the needs of the subscribers. If the inquiry to decision step 2120 is positive, then the "Yes" branch can be followed to step 2140 in which the exemplary embodiment illustrated in FIG. 20 should be selected to address the needs of the subscribers.

Figure 22:
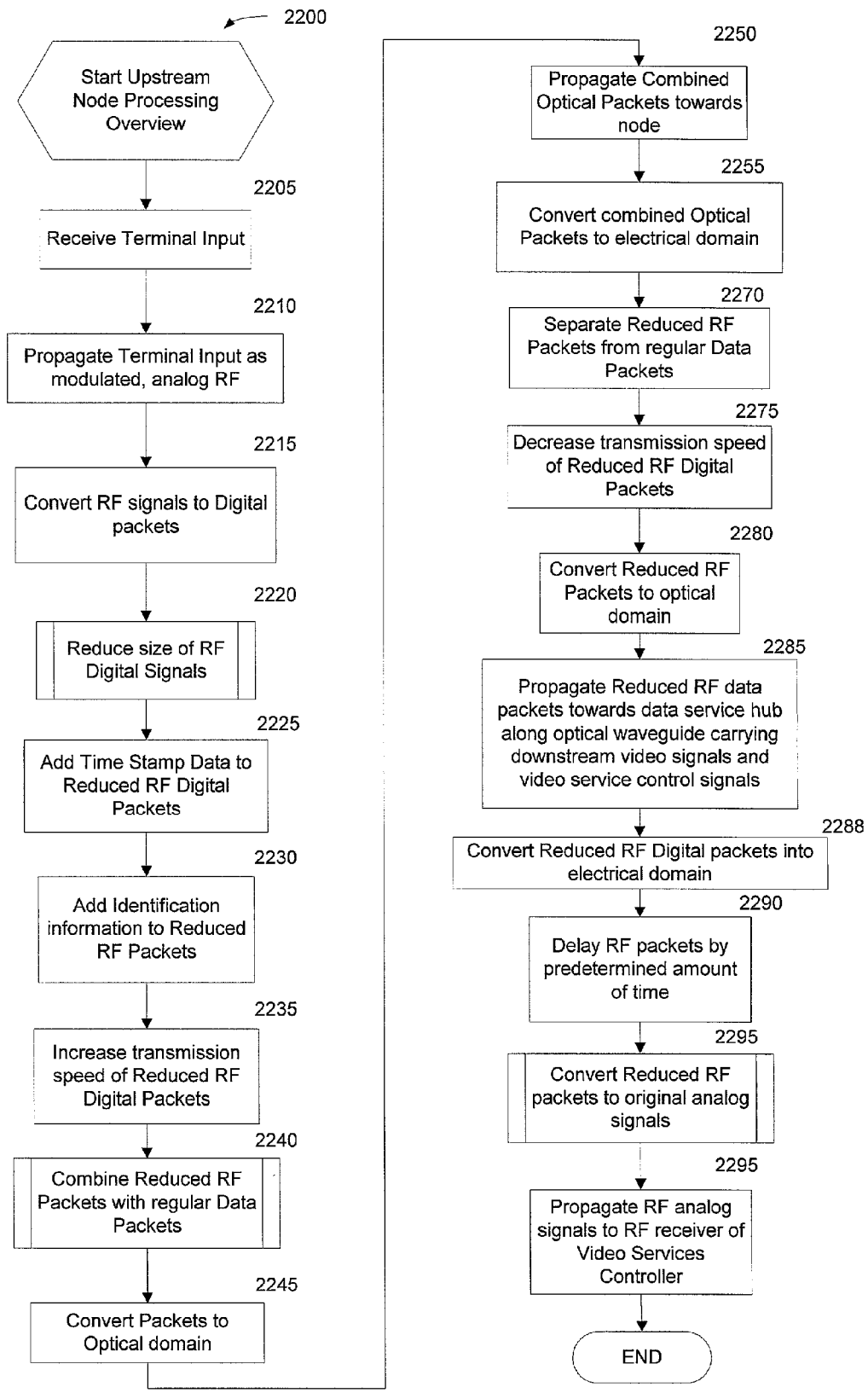
FIG. 22 is a logic flow diagram illustrating an exemplary method for propagating upstream RF signals towards a data service hub.

Referring now to FIG. 22, this figure illustrates an exemplary method for returning video service RF signals in an upstream direction. Basically, FIG. 22 provides an overview of the processing performed by the subscriber optical interfaces 140, laser transceiver nodes 120, and data service hub 110.

As noted above, certain steps in the process described below must naturally precede others for the present invention to function as described. However, the present invention is not limited to the order of the steps described if such order or sequence does not alter the functionality of the present invention. That is, it is recognized that some steps may be performed before or after other steps without departing from the scope and spirit of the present invention.

Step 2205 is the first step in the exemplary upstream overview process 2200. In step 2205, terminal input is received at a video service terminal 117. Next, in step 2210, the terminal input is propagated as modulated analog RF signals towards the subscriber optical interface 140.

In step 2215, the analog RF signals are converted to digital packets with the A/D converter 509. However, it is noted that step 2215 does not need to take place in the subscriber optical interface 140. As discussed above, the analog to digital conversion process can take place at the laser transceiver node 120 or it could occur at the video service terminal 117.

Next, in routine 2220, the size of the RF packets generated by the A/D converter 509 are reduced by the data reducer 511. Further details of routine 2220 have been described above with respect to FIG. 10D.

In step 2225 time-stamped data is added to the reduced RF packets. In step 2230, identification information is added to the reduced RF packet. This identification information can comprise headers used to uniquely identify RF packets from other types of data packets. Steps 2225 and 2230 can be performed by a data condition 407. However, functions identified in steps 2230 and 2235 can be accomplished with other hardware devices other than the data conditioners 407. The present invention is not limited to the hardware devices which performs the functions described in steps 2230 and 2235 nor is the present invention limited to the order in which these two steps are performed.

In routine 2240, the reduced RF packets are combined with regular data packets. Further details of routine 2240 will be discussed below with respect to FIG. 23.

In step 2245, the electrical packets are converted to the optical domain. Next, in step 2250, the combined optical packets are propagated towards the laser transceiver node 120.

In step 2255, the combined optical packets are converted to the electrical domain with a digital optical receiver such as the receiver 370 as illustrated in FIG. 5. In step 2270, the reduced RF packets are separated from the regular data packets in the optical tap routing device 435 of the laser transceiver node 120.

The transmission speed of the reduced RF packets is then decreased by the data conditioner 407 in the laser transceiver node 120 (step 2275). Next, in step 2280, the reduced RF packets are converted back to the optical domain by a low power optical transmitter 325.

In step 2285, the reduced RF packets are propagated upstream towards a data service hub 110 along an optical wave guide 160 that also carries down stream video signals and video service control signals. In step 2288 the reduced RF Digital packets are converted back to the electrical domain in low speed data receiver 370. In step 2290, the RF Digital packets are delayed to their proper playout time in delay generator 305.

In routine 2295, the reduced RF packets are converted to the original RF analog signals that were originally produced by the video service terminals 117. Further details of routine 2295 have been described above with respect to FIG. 11b. In step 2298, the RF analog signals are propagated to the RF receiver 309 that is coupled to the video services controller 115.

Refer now to FIG. 23, this figure illustrates an exemplary subroutine or subprocess 2240 for combining reduced RF packets with regular data packets as discussed above with respect to FIG. 22.

The combining reduced RF packets with regular data packets routine 2240, starts with step 2305. In step 2305, the regular data transmission of ordinary data packets produced by the processor 550 in FIG. 8 is interrupted during predetermined intervals. As noted above, while the upstream transmission of data packets can be interrupted at intervals with upstream RF packet transmission, it is noted that the intervals of interruption do not need to be regularly spaced from one another in time. However, in one exemplary embodiment, the interruptions can be designed to be spaced at regular, uniform intervals from one another. In another exemplary embodiment (not shown), the interruptions could be spaced at irregular, non-uniform intervals from one another. In step 2310, reduced RF packets are inserted between irregular data packets if the RF packets are available during an interval.

Step 2310 corresponds to the simultaneous activation of switches 513 in each subscriber optical interface 140 that is part of a subscriber grouping. The subscriber groupings are usually determined by the number of subscribers that will be serviced by a particular video service receiver 309 that is typically located in the data service hub 110. After step 2310, the subprocess ends and the process returns to step 2245, FIG. 22.

Figure 24:
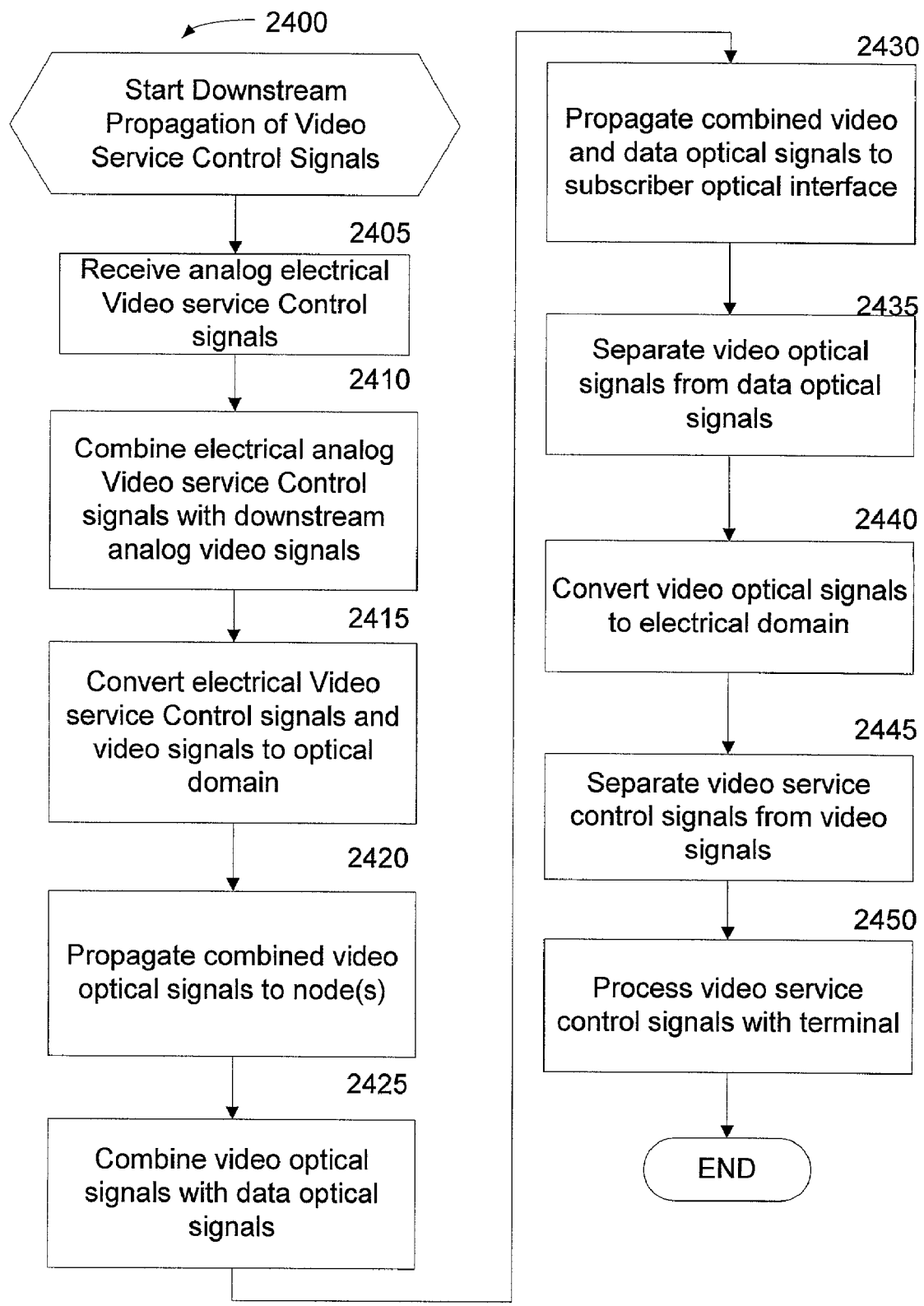
FIG. 24 is a logic flow diagram illustrating the exemplary processing of downstream video service control signals according to an exemplary embodiment of the present invention.

Refer now to FIG. 24, this Figure illustrates an exemplary method for propagating downstream analog video service control signals within an optical architecture. The downstream process 2400 starts in first step 2405. In step 2405, analog electrical video service control signals are received from a video service controller 115. Next, in step 2410, the analog electrical video service control signals are combined with analog downstream video signals.

In step 2415, the analog electrical video service control signals and video signals are converted to the optical domain with an optical transmitter 325. The combined video optical signals are propagated towards laser transceiver nodes 120 via optical wave guides 160. In step 2425, the combined video optical signals are also combined with data optical signals in the laser transceiver node 120. Specifically, in an exemplary embodiment of the present invention, the video optical signals can be combined with the data optical signals in a diplexer 420 The combined video and data optical signals are propagated along an optical wave guide 150 to a subscriber optical interface 120. In step 2435, the video optical signals are separated from the data optical signals with an optical diplexer 515. The video optical signals are then converted to the electrical domain with an analog optical receiver 525.

In step 2445, the video service control signals are separated from the regular video signals in the video services terminal 117. Next, in step 2450, the video service control signals are processed by the video service terminal 117.

The present invention is not limited to the aforementioned laser transceiver nodes. The present invention may employ nodes that operate with LEDs that produce wavelengths that may be unique to subscribers or groups of subscribers. In other words, each node can further comprise one or more wavelength division multiplexers and demultiplexers. Each wavelength division multiplexer (WDM) can select one or more wavelengths of optical bandwidth originating from a respective optical tap multiplexer. Each WDM can then combine the one or more wavelengths of optical bandwidth together and feed them into a single optical waveguide. In this way, one optical waveguide can service a number of individual optical taps that can correspond to the number of optical tap multiplexers present in the bandwidth transforming node. In such an exemplary embodiment, each optical tap can divide data signals between a plurality of subscribers and can be capable of managing optical signals of multiple wavelengths.

The present invention is not limited to providing a return path for just legacy video service terminals. The return path of the present invention can be carry signals of other hardware devices that may not characterized as "legacy" hardware. The present invention may simply be used to provide increased bandwidth for additional conventional electronic communication devices that are supported by the optical network.

Thus, the present invention provides a unique method for inserting RF packets (derived from RF signals produced by a terminal) between upstream packets comprising data generated by a subscriber with a digital communication device such as a computer or internet telephone. Thus, the present invention provides an RF return path for legacy terminals that shares a return path for regular data packets in an optical network architecture. The present invention also provides a way in which the upstream transmission timing scheme that is controlled by the legacy video service controller housed within the data service hub is preserved. The present invention can operate independently of the legacy upstream transmission timing scheme so that the legacy upstream transmission timing scheme can remain effective. The present invention can also adjust the transmission rate of RF packets during certain stages in an optical network in order to take advantage of lower cost hardware.

In another alternative exemplary embodiments, the present invention allows for less complex hardware that can be provided in the subscriber optical interface or laser transceiver node or both for subscribers that are not taking data services.

In other alternative exemplary embodiments, an optical signal present line in combination with a driver may be employed in order to reduce the amount or cost of hardware (or both) in a laser transceiver node.

It should be understood that the foregoing relates only to illustrate the embodiments of the present invention, and that numerous changes may be made therein without departing from the scope and spirit of the invention as defined by the following claims.

What is claimed is:

1. A return path of an optical network system comprising:
   a data service hub for processing upstream radio-frequency analog video service control signals and generating downstream radio-frequency analog video service control signals according to a first timing scheme, the data service hub comprising a data-to-radio-frequency converter for receiving upstream digital data signals comprising upstream radio-frequency video service control signals and a time stamp that preserves the first timing scheme and that initiates recovery of the upstream radio-frequency analog video service control signals by the converter from the upstream disital data signals;

at least one subscriber optical interface for receiving the upstream radio-frequency analog video service control signals, for converting the upstream radio-frequency analog video service control signals to first digital packets and combining the first packets with second packets in a time domain for upstream transmission towards the data service hub, for preserving the first timing scheme between the upstream and downstream video service control signals, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub; and one or more optical waveguides connected to the subscriber optical interface, for carrying the upstream optical signals and downstream optical signals that are propagated according to a second timing scheme independent of the first timing scheme.

2. The return path of claim 1, further comprising a laser transceiver node for communicating optical signals to the data service hub, and for apportioning bandwidth between subscribers of the optical network system.

3. The return path of claim 1, wherein the second packets comprise data other than the upstream radio-frequency analog video service control signals.

4. The return path of claim 1, wherein the subscriber optical interface further reduces a size of the first packets.

5. The return path of claim 1, wherein the subscriber optical interface comprises a data reducer for adjusting a size of the first packets.

6. The return path of claim 1, wherein the subscriber optical interface comprises a data conditioner for increasing a transmission speed of the first packets.

7. The return path of claim 6, wherein the data conditioner comprises a FIFO buffer.

8. The return path of claim 1, wherein the subscriber optical interface comprises a processor for administering a timing of when the first and second packets are combined.

9. The return path of claim 2, wherein the laser transceiver node coordinates timing among a plurality of subscriber optical interfaces.

10. The return path of claim 1, further comprising an optical tap coupled to the subscriber optical interface.

11. The return path of claim 1, further comprising a terminal for producing the upstream radio-frequency analog video service control signals and coupled to the subscriber optical interface.

12. A return path of an optical network system comprising:

a data service hub for processing upstream radio-frequency analog video service control signals and generating downstream radio-frequency video service control signals according to a first timing scheme, the data service hub comprising a data-to-radio-frequency converter for receiving upstream digital data signals comprising a time stamp that preserves the first timing scheme and that initiates recovery of the upstream radio-frequency analog video service control signals by the converter from the upstream digital data signals;

at least one subscriber optical interface for receiving the upstream radio-frequency analog video service control signals, for converting the upstream radio-frequency analog video service control signals to first digital packets and combining the first packets with second packets in a time domain for upstream transmission towards the data service hub, for preserving the timing scheme between the upstream and downstream video service control signals, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub; and a laser transceiver node for communicating optical signals to the data service hub, and for apportioning bandwidth between subscribers of the optical network system; and one or more optical waveguides connected to the laser transceiver node, for carrying the upstream optical signals and downstream optical signals that are propagated according to a second timing scheme independent of the first timing scheme.

13. The return path of claim 12, wherein the second packets comprise data other than the upstream radio-frequency analog video service control signals.

14. The return path of claim 12, wherein the laser transceiver node further reduces a size of the first packets.

15. The return path of claim 12, wherein the laser transceiver node comprises a data reducer for adjusting a size of the first packets.

16. The return path of claim 12, wherein the laser transceiver node comprises a data conditioner for increasing a transmission speed of the first packets.

17. The return path of claim 12, wherein the data conditioner comprises a FIFO buffer.

18. The return path of claim 12, further comprising an optical tap coupled to the subscriber optical interface.

19. The return path of claim 12, further comprising a terminal for producing the upstream radio-frequency analog video service control signals and coupled to the subscriber optical interface.

20. A return path of an optical network system comprising;

a data service hub for processing upstream video service control signals and generating downstream video radio-frequency analog service control signals according to a first timing scheme, the data service hub comprising a data-to-radio-frequency converter for receiving upstream digital data signals comprising a time stamp that preserves the first timing scheme and that initiates recovery of radio-frequency analog video service control signals by the converter from the upstream digital data signals;

at least one subscriber optical interface for receiving upstream electrical radio-frequency analog video service control signals, the subscriber optical interface converting the upstream radio-frequency analog video service control signals to digital electrical data first packets and for converting the digital electrical first data packets to optical data packets, for combining the first packets with second packets in a time domain and in a electrical domain for upstream transmission towards the data service hub, for preserving the first timing scheme between the upstream and downstream video service control signals, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub;

a laser transceiver node for communicating optical signals to the data service hub, for apportioning bandwidth between subscribers of the optical network system; and one or more optical waveguides connected to the laser transceiver node, for carrying the upstream optical signals and downstream optical signals that propagated according to a second timing scheme independent of the first timing scheme.

21. The return path of claim 20, wherein the laser transceiver node amplifies the optical data packets by converting them to electrical data packets and then reconverting the electrical data packets back to optical data packets.

22. The return path of claim 20, wherein the laser transceiver node amplifies the optical data packets with a solid state optical amplifier.

23. A method for providing a return path for signals in an optical network system comprising the steps of;
generating downstream radio-frequency analog video service control signals and receiving upstream radio-frequency analog video service control signals according to a first timing scheme;
converting the upstream radio-frequency analog signals to a plurality of first digital information packets;
receiving a plurality of second digital information packets;
preserving the first timing scheme between the upstream and downstream video service control signals by transmitting both sets of information packets by inserting the first digital information packets between the second digital information packets in a time domain;
propagating the packets towards a data service hub according to a second timing scheme independent of the first timing scheme;
receiving the first and second digital information packets at the data service tub;
detecting a time stamp in the first digital information packets with a data-to-radio-frequency converter of the data service hub; and
initiating recovery of the upstream radio-frequency signals from the first digital information packets with the data-to-radio-frequency converter in response to detecting the time stamp, the time stamp preserving the first timing scheme.

24. The method of claim 23, further comprising the step of converting the first digital information packets back to upstream radio-frequency analog video service control signals.

25. The method of claim 23, wherein the step of receiving the plurality of second digital information packets, further comprises receiving the plurality of second digital information packets from one of a computer and an internet telephone.

26. The method of claim 23, wherein the step of receiving a plurality of second digital information packets, further comprises receiving a plurality of second digital information packets having irregular sizes.

27. The method of claim 23, wherein the step of converting the upstream radio-frequency analog video service control signals further comprises converting the upstream radio-frequency analog video service control signals to a plurality of first digital information packets having a uniform length of time slot for their transmission.

28. The method of claim 23, further comprising the steps of:
controlling a first time scheme with a first controller for the reception of the upstream radio-frequency analog video service control signals; and
controlling a second timing scheme with a second controller for transmission of the first and second digital information packets, the second controller operating independently of the first controller.

29. The method of claim 23, further comprising the step of preserving the first timing scheme with the second timing scheme by sizing transmission intervals of the second timing scheme such that the transmission intervals are smaller than reception intervals of the first timing scheme.

30. The method of claim 23, wherein the step of transmitting further comprises inserting the first digital information packets between the second digital information packets during uniformly spaced intervals.

31. The method of claim 23, further comprising the step of increasing a propagation speed of the fist digital information packets prior to the step of transmitting both sets of information.

32. The method of claim 23, further comprising the step of further comprising the step of decreasing a propagation speed of the first digital information packets prior to the step of receiving the first digital information packets at a data service hub.

33. An optical network system comprising:
a data service hub for processing upstream radio-frequency analog video service control signals and generating downstream radio-frequency analog video service control signals according to a first timing scheme, the data service hub comprising a data-to-radio-frequency converter for receiving upstream digital data signals comprising a time stamp that preserves the timing scheme and path initiates recovery of the upstream radio-frequency analog video service control signals by the converter from the upstream digital data signals;

at least one subscriber optical interface, for receiving the upstream radio-frequency analog video service control signals, for converting the radio-frequency analog video service control signals to first digital packets and combining the first packets with second packets in a time domain for upstream transmission towards the data service hub, for preserving the first timing scheme between the upstream and downstream video service control signals, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub;

a laser transceiver node for communicating optical signals between the data service hub and the subscriber optical interface and for apportioning bandwidth between subscribers of the optical network system, the laser transceiver node further comprising two or more optical receivers that share a tap multiplexer; and one or more optical waveguides connected to the laser transceiver node, for carrying the upstream optical signals and downstream optical signals that are propagated according to a second timing scheme independent of the first timing scheme.

34. The optical network system of claim 33, wherein each optical receiver further comprises an optical signal detector for detecting optical signals.

35. A method for providing a return path for signals in an optical network system comprising the steps of:
generating downstream radio-frequency analog video service control signals and receiving upstream radio-frequency analog video service control signals according to a first timing scheme;
converting the upstream radio-frequency analog video service control signals to a plurality of first digital information packets;
receiving a plurality of second digital information packets;
preserving the first timing scheme between the upstream and downstream video service control signals by positioning the first digital information packets between the second digital information packets to form a continuous information stream in a time domain;
propagating the information stream along an optical waveguide towards a data service hub according to a second time scheme;
detecting a time stamp in the first digital information packets with a data-to-radio-frequency converter of the data service hub, the time stamp preserving the first timing scheme; and
initiating recovery of the upstream radio-frequency analog video service control signals from the first digital information packets with the data-to-radio-frequency converter in response to detecting the time stamp.

36. The method of claim 35, further comprising the step of converting the first digital information packets back to upstream radio-frequency analog video service control signals.

37. The method of claim 35, wherein the step of receiving the plurality of second digital information packets, further comprises receiving the plurality of second digital information packets from one of a computer and an internet telephone.

38. The method of claim 35, further comprising the step of forming the upstream radio-frequency analog video service control signals in response to commands inputted into a video services terminal.

39. A return path of an optical network system comprising:
a data service hub for processing upstream radio-frequency analog video service control signals and generating downstream radio-frequency analog video service control signals according to a first timing scheme, the data service hub comprising a data-to-radio-frequency converter for receiving upstream digital data signals comprising a time stamp that preserves the first timing scheme and that initiates recovery of upstream radio-frequency analog video service control signals by the converter from the upstream digital data signals;
at least one subscriber optical interface for receiving the upstream radio-frequency analog video service control signals, for converting the the upstream radio-frequency analog video service control signals to first digital packets for upstream transmission as optical signals towards the data service hub, and combining the first packets with second packets in a time domain prior to upstream transmission, for preserving the first timing scheme between the upstream and downstream video service control signals, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub; and
one or more optical waveguides connected to the subscriber optical interface, for carrying the upstream optical signals that are propagated according to a second timing scheme independent of the first timing scheme.

40. The return path of claim 39, wherein the subscriber optical interface further reduces a size of the packets.

41. The return path of claim 39, wherein the subscriber optical interface comprises a data reducer for adjusting a size of the packets.

42. The return path of claim 39, wherein the subscriber optical interface comprises a data conditioner for increasing a transmission speed of the digital packets.

43. The return path of claim 42, wherein the data conditioner comprises a FIFO buffer.

44. The return path of claim 39, wherein the subscriber optical interface detects a presence of an RF signal destined for the data service hub.

45. A return path of an optical network system comprising:
a data service hub for processing upstream radio-frequency analog and generating downstream radio-frequency analog video service control signals according to a first timing scheme, the data service hub comprising a data-to-radio-frequency converter for receiving upstream digital data signals comprising a time stamp that preserves the first timing scheme and that initiates recovery of the upstream radio-frequency analog video service control signals by the converter from the upstream digital data signals;
a subscriber optical interface for receiving electrical upstream radio-frequency analog video service control signals, for converting the electrical upstream radio-frequency analog signals to first digital packets and combining the first packets with second packets in a time domain for upstream transmission towards the data service hub, for preserving the first timing scheme between the upstream and downstream video service control signals, the subscriber optical interface comprising an optical transmitter for converting the first and second packets into the optical domain, the subscriber optical interface further comprising an analog-to-digital converter for converting the upstream radio-frequency analog video service control signals into digital data signals prior to first packet formation and for adding the time stamp to the digital data signals that preserves the first timing scheme of the video service control signals of the data service hub; and
one or more optical waveguides connected to the subscriber optical interface for carrying the upstream optical signals and downstream optical signals that are propagated according to a second timing scheme independent of the first timing scheme.

46. The return path of claim 45, wherein the data service hub comprises an RF return device for controlling a timing of RF return signals generated by a plurality of subscribers.

47. The return path of claim 45, wherein the optical transmitter comprises an analog laser.

48. The return path of claim 45, wherein the optical transmitter comprises a Fabry-Perot laser.

49. The return path of claim 45, wherein the optical transmitter comprises an RF presence detector for controlling the optical transmitter.

50. A method for returning signals from subscribers to a data service hub in an optical network system comprising:

generating downstream radio-frequency analog video service control signals and receiving upstream radio-frequency analog video service control signals according to a first timing scheme;

receiving electrical upstream radio-frequency analog video service control signals at a subscriber optical interface;

converting the upstream radio-frequency analog video service control signals to a plurality of first digital information packets;

receiving a plurality of second digital information packets;

preserving the first timing scheme between the upstream and downstream video service control signals by transmitting both sets of information packets by inserting the first digital information packets between the second digital information packets in a time domain;

converting the first and second digital information packets into optical signals;

transmitting the optical signals to the data service hub according to a second timing scheme independent of the first timing scheme;

detecting a time stamp in the first digital information packets with a data-to-radio-frequency converter of the data service hub; and initiating recovery of the upstream radio-frequency analog video service control signals from the first digital information packets with the data-to-radio-frequency converter in response to detecting the time stamp.

51. The method of claim 50, further comprising controlling the timing scheme of the upstream radio-frequency analog video service control signals with the data service hub.

52. The method of claim 50, wherein converting the first and second digital information packets into optical signals further comprises modulating an optical transmitter with the first and second digital information packets.

53. The method of claim 48, further comprising detecting a presence of upstream radio-frequency analog video service control signals at the subscriber optical interface.

* * * * *

UNITED STATES PATENT AND TRADEMARK OFFICE
CERTIFICATE OF CORRECTION

PATENT NO. : 7,184,664 B2 Page 1 of 1
APPLICATION NO. : 10/041299
DATED : February 27, 2007
INVENTOR(S) : James O. Farmer et al.

It is certified that error appears in the above-identified patent and that said Letters Patent is hereby corrected as shown below:

Claim 1, column 43, line 3 "signals by the converter from the upstream disital data" should be changed to --signals by the converter from the upstream digital data--.

Claim 20, column 45, line 13, "signals and downstream optical signals that propagated" should be -- signals and downstream optical signals that are propagated--.

Claim 23, column 45, line 42, of the issued grant needs correction. The phrase of "at the data service tub;" should be --at the data service hub--.

Claim 31, column 46, line 23, of the issued grant needs correction. The phrase of "of increasing a propagation speed of the fist digital infor-" should be --of increasing a propagation speed of the first digital infor--.

Claim 33, column 46, line 39, of the issued grant needs correction. The phrase of "timing scheme and path initiates recovery of the" should be --timing scheme and that initiates recovery of the--.

Signed and Sealed this

Eighth Day of May, 2007

JON W. DUDAS
*Director of the United States Patent and Trademark Office*